(12) United States Patent
Riley et al.

(10) Patent No.: US 8,068,443 B2
(45) Date of Patent: *Nov. 29, 2011

(54) USING DISTRIBUTED TIMERS IN AN OVERLAY NETWORK

(75) Inventors: John Reed Riley, Bellevue, WA (US); David A. Wortendyke, Seattle, WA (US); Michael J. Marucheck, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

This patent is subject to a terminal disclaimer.

(21) Appl. No.: 12/490,213

(22) Filed: Jun. 23, 2009

(65) Prior Publication Data

US 2010/0322256 A1    Dec. 23, 2010

(51) Int. Cl.
*H04L 12/28* (2006.01)

(52) U.S. Cl. ........ 370/258; 370/252; 370/389; 370/392; 709/251

(58) Field of Classification Search ........................ None
See application file for complete search history.

(56) References Cited

U.S. PATENT DOCUMENTS

| | | | |
|---|---|---|---|
| 7,221,377 B1 | 5/2007 | Okita | |
| 7,526,523 B2 | 4/2009 | Nekovee | |
| 2002/0144004 A1* | 10/2002 | Gaur et al. | 709/310 |
| 2005/0198286 A1 | 9/2005 | Xu | |
| 2007/0233835 A1 | 10/2007 | Kushalnagar et al. | |
| 2008/0181135 A1 | 7/2008 | Yalagandula | |
| 2008/0253402 A1 | 10/2008 | Prudden | |
| 2009/0116484 A1 | 5/2009 | Buford | |
| 2009/0125637 A1 | 5/2009 | Matuszewski | |
| 2010/0325190 A1* | 12/2010 | Riley et al. | 709/201 |

FOREIGN PATENT DOCUMENTS

| | | |
|---|---|---|
| WO | W02008102195 | 8/2008 |
| WO | W02009071971 A2 | 6/2009 |

OTHER PUBLICATIONS

Andersen, David, et al., "Resilient Overlay Networks", 18th ACM Symp. on Operating Systems Principles (SOSP), Oct. 2001, 15 pages.
Wu, Yinghui, et al., "ONSP: Parallel Overlay Network Simulation Platform", 2004, 12 pages.
Wilcox, Matthew, "I'll Do It Later: Softirqs, Tasklets, Bottom Halves, Task Queues, Work Queues and Timers", 2002, 6 pages.
Wikipedia, "Distributed hash table", 2009, 7 pages.
"The Bamboo Distributed Hash Table", 2004, 4 pages.
Oracle, "Timer and Work Manager API (CommonJ) Programmer's Guide" The Timer and Work Manager API, 2008, 9 pages.
Yoshikawa, Chad, et al., "Distributed Hash Queues: Architecture & Design", 2008, 12 pages.
Tati, Kiran, et al., "ShortCuts: Using Soft State to Improve DHT Routing", Jul. 2006, 18 pages.
U.S. Appl. No. 12/490,215, Mail Date Apr. 1, 2011, Notice of Allowance.

* cited by examiner

*Primary Examiner* — Duc C Ho

(74) *Attorney, Agent, or Firm* — Workman Nydegger

(57) ABSTRACT

The present invention extends to methods, systems, and computer program products for using distributed timers in an overlay network. Embodiments of the invention can be used to replicate timers within an overlay network and can be used to make progress towards completing a portion of work within the overlay network based on a replicated timer. Accordingly, embodiments of the invention can be used to increase the availability of timer data as well as compensate for node failures within an overlay network.

20 Claims, 16 Drawing Sheets

USING DISTRIBUTED TIMERS IN AN OVERLAY NETWORK

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

In some computing environments, processes will, from time to time, sleep or hibernate for a period of time, and then reawaken to process additional data. For example, a process can determine that processing depends on further data that is scheduled to be delivered at some time in the future. Alternately, a process can determine that processing results are not of value to another computer system until some time in the future. Thus, the process can go to sleep and give instructions to be awakened at a specified time. For example, a process can set a timer that indicates a specified wake time and may also include data that is to be sent to the process when awakened.

A timer can be stored in durable storage. Thus, if the computer system monitoring the timer malfunctions or crashes, the timer can be reloaded when the computer system returns to normal operations. However, even when timers are stored durably, there is no guarantee that a timer is available at the timer's specified wake time. For example, a computer system crash or malfunction can result in the computer system being down at the specified wake time indicated in a timer. As such, the timer does not fire and any further processing that would otherwise occur is not even initiated. A computer system being down at a specified wake time can also lead to difficulties in recovery. That is, when the process is eventually re-activated, it may not know how to continue if other systems interacting with the process no longer have data for or need data from the process.

Machines can be clustered to provide increased availability for timers. However, as the number of timers and machines increases, distributing the timers can create a large amount of network traffic. For example, each time a node is added or removed from the cluster, network traffic is created between all the nodes in the cluster to re-distribute existing timers.

BRIEF SUMMARY

The present invention extends to methods, systems, and computer program products for using distributed timers in an overlay network. In some embodiments, timers are replicated within an overlay network. Data is received for a process at a node. The node is assigned responsibility for a specified range of identifiers on the overlay network. The process is identified by an identifier within the specified range of identifiers. The process processes the data to partially complete a portion of work.

The process outputs a timer based on the partially completed portion of work. The timer indicates of an amount of time that further progress towards completing the portion of work is to be suspended. The timer includes deferred data that is to be processed when further progress towards completing the portion of work is resumed and a designated time indicating when the timer is to expires and further progress towards completing the portion of work is to be resumed. The timer is supplemented with the identifier for the process. The timer is replicated to a plurality of other nodes on the overlay network for storage in durable storage at each of the plurality of other nodes. Replicating the timer increases the availability of the deferred data. Accordingly, if responsibility for the identifier is subsequently reassigned to one of the plurality of other nodes, the deferred data is available to the process when the timer expires and further progress towards completing the portion of work is to resume.

In other embodiments, a node assumes ownership of a replicated timer. A node receives a replicated timer related to a process at another node on the overlay network. The replicated timer represents that the process has partially completed a portion of work at the other node. The timer indicates that further progress towards completing the portion of work is suspended for some period of time. The timer includes: timer data that is to be processed when further progress toward completing the portion of work resumes, a designated time when the timer is to expire (and, for example, when further progress toward completing the portion of work is to resume), and an identifier for the process. The identifier is outside the specified range of identifiers assigned to the node.

A change in the node configuration on the overly network is detected subsequent to receiving the replicated timer. The specified range of identifiers for the node is updated based on the detected change in node configuration. The update to the specified range of identifiers changes the assigned responsibilities for the node. It is determined that the identifier for the process is within the updated specified range of identifiers. As such, the node is assigned responsibility for indicating when the timer expires and further progress towards completing the portion of work is to resume, in view of the changed node configuration.

It is determine that the designated time has been reached subsequent to the node being assigned responsibility for indicting when the timer expires. The node indicates to the process that the timer has expired. The timer data is submitted to the process. Accordingly, the process can use the timer data to progress further towards completing the portion of work.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

Figure 1A:
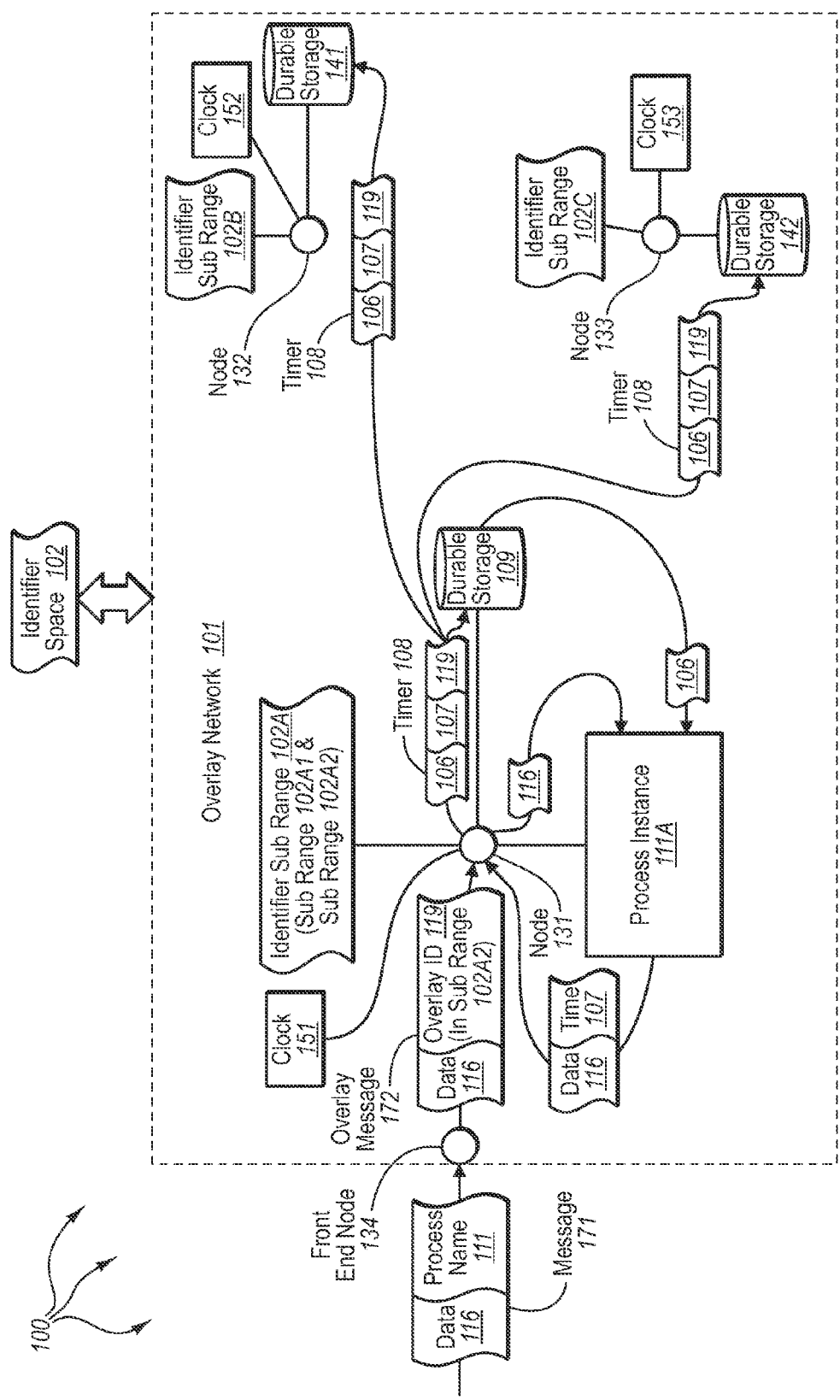
FIG. 1A illustrates an example computer architecture that facilitates replicating timers within an overlay network.

The present invention extends to methods, systems, and computer program products for using distributed timers in an overlay network In some embodiments, timers are replicated within an overlay network. Data is received for a process at a node. The node is assigned responsibility for a specified range of identifiers on the overlay network. The process is identified by an identifier within the specified range of identifiers. The process processes the data to partially complete a portion of work.

The process outputs a timer based on the partially completed portion of work. The timer indicates of an amount of time that further progress towards completing the portion of work is to be suspended. The timer includes deferred data that is to be processed when further progress towards completing the portion of work is resumed and a designated time indicating when the timer is to expires and further progress towards completing the portion of work is to be resumed. The timer is supplemented with the identifier for the process. The timer is replicated to a plurality of other nodes on the overlay network for storage in durable storage at each of the plurality of other nodes. Replicating the timer increases the availability of the deferred data. Accordingly, if responsibility for the identifier is subsequently reassigned to one of the plurality of other nodes, the deferred data is available to the process when the timer expires and further progress towards completing the portion of work is to resume.

In other embodiments, a node assumes ownership of a replicated timer. A node receives a replicated timer related to a process at another node on the overlay network. The replicated timer represents that the process has partially completed a portion of work at the other node. The timer indicates that further progress towards completing the portion of work is suspended for some period of time. The timer includes: timer data that is to be processed when further progress toward completing the portion of work resumes, a designated time when the timer is to expire (and, for example, when further progress toward completing the portion of work is to resume), and an identifier for the process. The identifier is outside the specified range of identifiers assigned to the node.

A change in the node configuration on the overly network is detected subsequent to receiving the replicated timer. The specified range of identifiers for the node is updated based on the detected change in node configuration. The update to the specified range of identifiers changes the assigned responsibilities for the node. It is determined that the identifier for the process is within the updated specified range of identifiers. As such, the node is assigned responsibility for indicating when the timer expires and further progress towards completing the portion of work is to resume, in view of the changed node configuration.

It is determine that the designated time has been reached subsequent to the node being assigned responsibility for indicting when the timer expires. The node indicates to the process that the timer has expired. The timer data is submitted to the process. Accordingly, the process can use the timer data to progress further towards completing the portion of work.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

Within this description and following claims, a "physical network" is defined as one or more data links that enable the transport of electronic data between computer systems and/or modules and/or other electronic devices.

Within this description and in the following claims, an "overlay network" is defined as a computer network that is built on top of another network (e.g., a physical network or another overlay network). Nodes on an overlay network can be viewed as being connected by virtual or logical links, each of which corresponds to a path, perhaps through many physical networks and/or data links, in an underlying network. For example, many peer-to-peer networks are overlay networks because they run on top of the Internet. Overlay networks can be constructed in order to permit routing messages to destinations not specified by an IP address. For example, distributed hash tables can be used to route messages to a node having specific logical address, whose IP address is not known in advance. Overly networks can be of various configurations, including rings as described in greater detail below.

When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system (or "node") configurations. A computer system or node can include one or more processors and systems memory. For example, a computer system or node can be any of: personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

In some embodiments, hardware modules, such as, for example, special purpose integrated circuits or Gate-arrays are optimized to represent a node that implements the principles of the present invention.

Using Replicated Timers On an Overlay Network

In some embodiments, replicated timers are used to wake sleeping processes. For example, upon expiration of a timer, one process can activate a dormant process to perform a portion of work or resume further progress towards completed a portion of work that was suspended. In other embodiments, replicated timers are used to implement event-driven systems. For example, when a timer expires, one process can notify another process that the timer has expired. In response to the notification, the other process can react by performing computing operations. As such, expiration of the timer is essentially an event that triggers activities at the notified process.

Figure 1B:
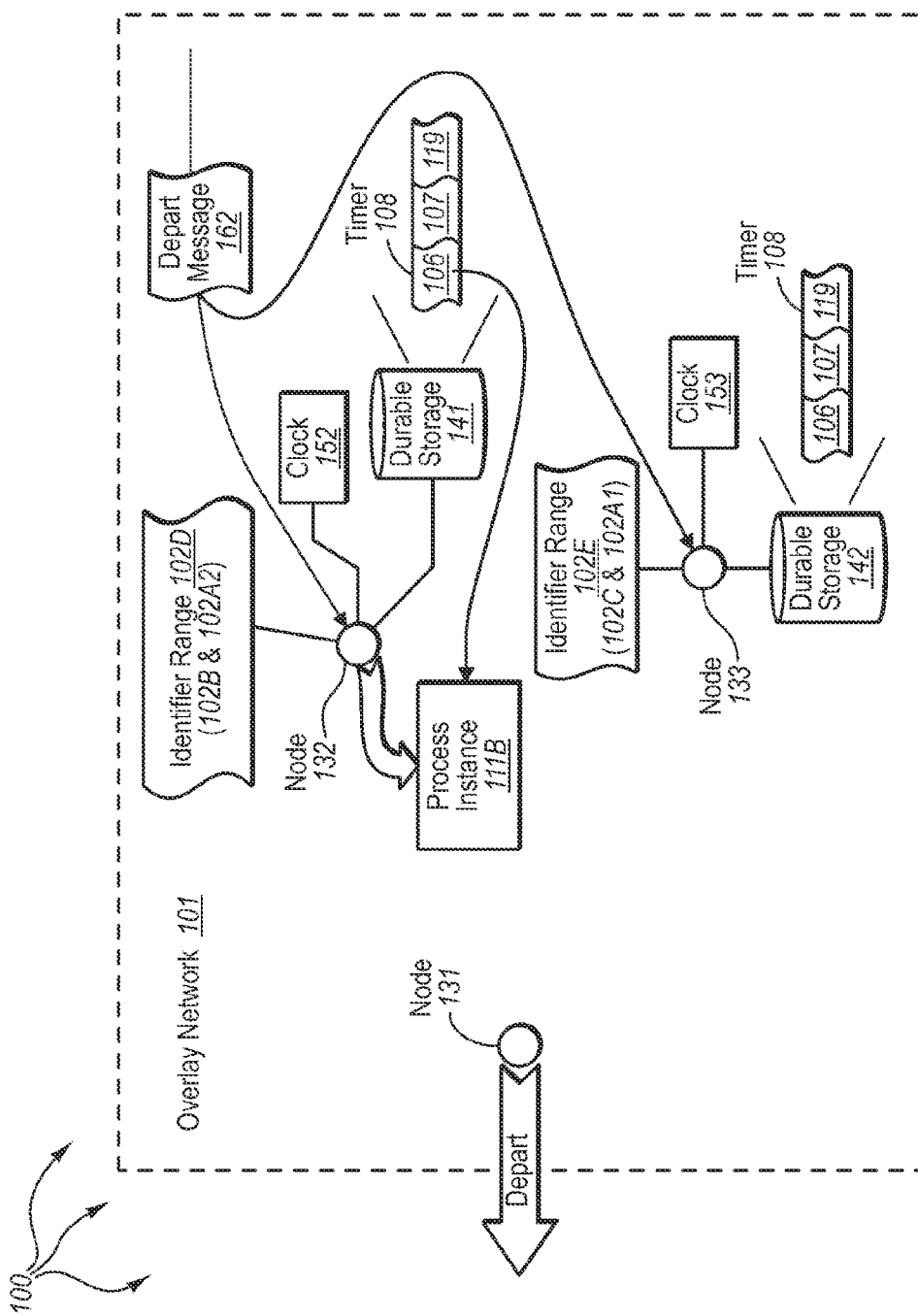
FIG. 1B illustrates an example computer architecture that facilitates assuming ownership of a replicated timer within an overlay network.

FIG. 1A, for example, illustrates an example computer architecture 100 that facilitates replicating timers within an overlay network 101. FIG. 1B illustrates example computer architecture 100 that facilitates assuming ownership of a replicated timer within overlay network 101. As depicted, computer architecture 100 includes overlay network 101. Overlay network 101 can be built on top of virtually any type of underlying network such as, for example, a Local Area Network ("LAN"), a Wide Area Network ("WAN"), and even the Internet. Accordingly, each node of overlay network 101 can create message related data and exchange message related data using overlay protocols. The overlay protocols can be based on Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.

Overlay network 101 includes a plurality of nodes including nodes 131, 132, and 133 and front end node 134. Nodes in overlay network 101 can be connected to a portion of durable storage. For example, nodes 131, 132, and 133 are connected to durable storage 109, 141, and 142 respectively. Data stored in durable storage remains stored at the durable storage when power is removed from the durable storage. Thus, when power is reapplied to the durable storage, data stored at the durable storage is again available. Durable storage includes, for example, magnetic hard disks, flash memory, etc.

Identifier space 102 can be used to identify components within overlay network 102. Identifier space 102 can be configured with a sufficient number of unique identifiers based on the functionality that is being provided in overlay network. Nodes within overlay network 101 can implement identifier assignment protocols between one another that coordinate assigning responsibility for sub ranges of identifiers within identifier space 102. Thus, implementing these protocols, nodes within overlay network 101 can be assigned responsibility for sub ranges of identifiers within identifier space 102. For example, nodes 131, 132, and 133 are assigned responsibility for identifier sub ranges 102A, 102B, and 102C respectively.

Nodes within overlay network 101 can also implement routing protocols for routing messages between one another to the node that is responsible for the message. Messages received at overlay network 101 can include an identifier from within identifier space 102. Thus, messages received at overlay network 101 can be routed between nodes to the node that is assigned responsibility for the identifier. The responsible node then provides the appropriate functionality for processing any data contained in the message.

Overly network 101 can include one or more front end nodes, such as, for example, front end node 134. A front end node is a node that interfaces between overly network 101 and systems that are external to network overlay network 101. Front end nodes can participate in addressing schemes external to overlay network 101. As such, external systems can direct messages to a front end node to utilize functionality offered in overlay network 101.

For example, a computer system external to overlay network 101 can send message 171 to front end node 134. As depicted, message 171 includes data 116 and process name 111 (e.g., the name of a workflow). Process name 111 can be the name of a process that is to process data 116. Front end node 134 can receive message 171 and correspondingly configure overlay message 172 for routing within overlay network 101. Overlay message 172 includes data 116 and overlay ID 119. Front end node 134 can implement an appropriately configured hashing algorithm to hash process name 111 into overlay identifier 119 (an identifier within identifier space 102). For example, overlay identifier 119 is within identifier sub range 102A and more specifically within sub range 102A2.

Front end node 134 can implement appropriate routing protocols to initiate routing overlay message 172 to the node assigned responsibility for overlay ID 119. Message 172 can be routed through one or more other nodes in overlay network 101 before arriving at node 131 (the node assigned responsibility for overlay identifier 119). Nodes on overlay network 101 can have access to executable instructions for activating various different processes to process data. From an overlay identifier, a node can determine what process to activate. For example, upon receiving overlay identifier 119, node 131 can determine that it is to activate an instance of process name 111. As such, node 131 can activate process instance 111A (e.g., a workflow instance).

Node 131 can then send data 116 to process instance 111A for processing. Process instance 111A can process data 116 to partially complete a portion of work. During processing, process instance 111A can determine that it is to sleep for some period of time (e.g., to wait to receive further data, to wait to generate further data, etc.) before again awakening to process data. Upon determining it is to sleep, process instance 111A can generate a timer and send the timer to node 131. Processes instance 111A can then go to sleep. The timer can include a designated time when process instance 111A is to be awakened along with data that is to be sent to process instance 111A when it is awakened.

For example, process instance 111A can send timer 108 to node 131. Timer 108 includes data 106 and time 107. Time 107 is a designated time when process instance 111A is to be awakened. Node 131 can supplement timer 108 with overlay identifier 119. Node 131 can use overlay identifier 119 for subsequent confirmation that timer 108 corresponds to process instance 111A.

Node 131 can track time 107 relative to the time indicated at clock 151 (e.g., in system memory). When clock 151 reaches time 107, node 131 refers to timer 108 to determine if it is responsible for timer 108. For example, node 131 can determine if it is (still) assigned responsibility for overlay identifier 119. If so, node 131 wakes process instance 111A and sends data 106 (either from memory or durable storage 109) to process instance 111A. Node 131 also stores timer 108 to durable storage 109. Thus, if node 131 crashes, is rebooted, or otherwise loses state in volatile memory, node 131 can retrieve timer 108 upon returning to normal operations.

Additionally, node 131 replicates timer 108 to one or more other nodes in overlay network 101. Node 131 can utilize appropriate routing protocols to send messages containing timer 108 to overlay IDs assigned to the one or more other nodes. For example, node 131 can replicate timer 108 to nodes 132 and 133. Upon receiving a replicated timer, a receiving node can begin tracking the designated time in the timer relative to a clock. For example, node 132 can track time 107 relative to clock 152 and node 133 can track time 107 relative to clock 153.

A node receiving a replicated timer can also store the timer in durable storage. For example, node 132 can store timer 108 in durable storage 141 and node 133 can store timer 108 in durable storage 142. Thus, if either of nodes 132 or 133 crash, are rebooted, or otherwise loses state in volatile memory, they can retrieve timer 108 upon returning to normal operations.

When clock 152 and/or clock 153 reaches time 107, node 132 and/or 133 refers to timer 108 to determine if it is responsible for timer 108. For example, node 132 and/or 133 can each determine if they are (now) assigned responsibility for overlay identifier 119. When a node is not responsible for timer, the node does not attempt to wake up or send data to a process corresponding to the timer. For example, when node 131 is assigned responsibility for overlay identifier 119, neither node 132 nor node 133 attempts to activate or send data 106 to an instance of process 111.

However, it may be that responsibility for overlay identifier 119 (and thus responsibility for process name 111) changes after process instance 111A issues timer 108. For example, when the node configuration in overlay network 101 changes, identifier assignment protocols can re-assign responsibility for different sub ranges of identifier space 102. For example, when a node joins overly network 101, portions of existing identifier ranges for one or more existing nodes can be re-assigned from the one or more existing nodes to the joining node. Likewise, when a node departs from overlay network 101, portions of the identifier range assigned to the leaving node can be re-assigned to one or more remaining nodes.

Thus, if node 131 departs overlay network 101 (either in an orderly manner or due to a malfunction (crash, loss of power, etc.)), portions of identifier range 102A can be re-assigned to other remaining nodes, such as, for example, nodes 132 and 133. Referring now to FIG. 1B, node 131 departs overlay network 101. Nodes in overlay network 101 can receive depart message 162 indicating that node 131 has departed.

In response to the departure of node 131, identifier assignment protocols re-assign responsibility for identifier sub range 102A. Responsibility for sub range 102A is split between nodes 132 and 133. Identifier sub range 102A2 is re-assigned to node 132. Thus, node 132 is assigned responsibility for identifier sub range 102D, including identifier sub range 102B and identifier sub range 102A2. Similarly, identifier sub range 102A1 is re-assigned to node 133. Thus, node 133 is now assigned responsibility for identifier sub range 102E, including identifier sub range 102C and identifier sub range 102A1.

Re-assignment of identifier sub-range 102A may complete before or after a timer expires.

For example, it may be that clock 152 reaches time 107 subsequent to node 132 being re-assigned responsibility for identifier sub range 102A2, and thus responsibility for overly identify 119. When clock 152 reaches time 107, node 132 refers to timer 108 to determine if it is responsible for timer 108. For example, node 132 can determine that it is (now)

assigned responsibility for overlay identifier 119. As such, node 132 can activate process instance 111B (e.g., another workflow instance for process name 111). Node 132 can then send data 106 (from memory or durable storage 141) to process instance 111B for processing.

On the other hand, it may be that clock 152 reaches time 107 prior to node 132 being re-assigned responsibility for sub range 102A2. Thus, upon re-assignment of sub range 102A2 to node 132, node 132 determines (e.g., either through checking periodically or through notification of re-assign responsibilities) that time 107 has already passed. In response, to the determination node 132 activates process 111B and sends data 106 to process instance 111B for processing.

Thus, embodiments of the invention permit other nodes in an overlay network to handle a timer even when the node that originated the timer is down when a process is to be awakened. Accordingly, embodiments of the invention significantly increase the likelihood that a timer is appropriately handled within an overlay network.

Ring Overlay Network

Embodiments of the invention can be practiced using various different types of overlay networks. In some embodiments, the invention is practiced using a ring overlay network. In a ring overlay network, nodes federate with one another to form a ring. Nodes on a ring can federate together using a variety of different mechanisms. Accordingly, a ring overlay network consists of a federated set of nodes that cooperate among themselves to form a dynamic and scalable network in which information can be systematically and efficiently disseminated and located.

Nodes are organized to participate in a federation as a sorted list using a binary relation that is reflexive, anti-symmetric, transitive, total, and defined over the domain of node identities. Both ends of the sorted list are joined, thereby forming a ring. Thus, each node in the list can view itself as being at the middle of the sorted list (as a result of using modulo arithmetic). Further, the list is doubly linked so that any node can traverse the list in either direction.

Each federating node can be assigned an ID (e.g., by a random number generator with duplicate detection) from a fixed set of IDs between 0 and some fixed upper bound. Thus, adding 1 to an ID of the fixed upper bound results in an ID of zero (i.e., moving from the end of the linked list back to the beginning of the linked list). In addition, a 1:1 mapping function from the value domain of the node identities to the nodes themselves is defined.

Figure 2:
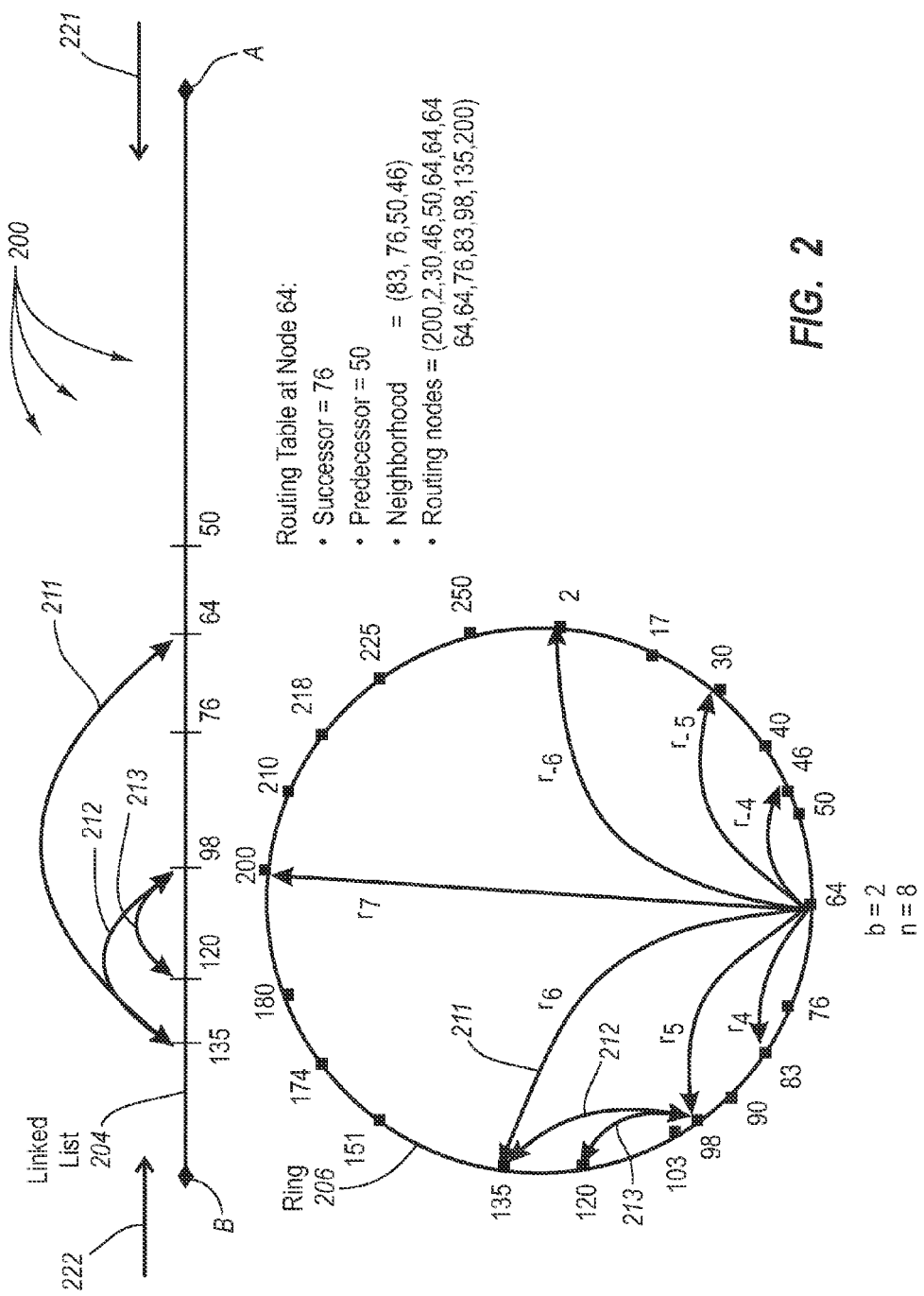
FIG. 2 illustrates an example binary relationship between nodes in a federation infrastructure in the form of a sorted list and corresponding ring.

FIG. 2 illustrates an example binary relationship between nodes in a federation infrastructure in the form of a sorted list 204 and corresponding ring 206. Given such a ring, the following functions can be defined:

---

RouteNumerically(V, Msg): Given a value V from the value domain of node identities and a message "Msg," deliver the message to node X whose identity can be mapped to V using the mapping function.
Neighborhood(X, S): Neighborhood is the set of nodes on the either side of node X with cardinality equal to S.

---

When every node in the federation has global knowledge of the ring, RouteNumerically(V, Msg) is implemented by directly sending Msg to the node X, whose identity is obtained by applying the mapping function to V. Alternately, when nodes have limited knowledge of other nodes (e.g., only of immediately adjacent nodes), RouteNumerically(V, Msg) is implemented by forwarding the message to consecutive nodes along the ring until it reaches the destination node X.

Alternately (and advantageously), nodes can store enough knowledge about the ring to perform a distributed binary search (without having to have global knowledge or implement routing between immediately adjacent nodes). The amount of ring knowledge is configurable such that maintaining the ring knowledge has a sufficiently small impact on each node but allows increased routing performance from the reduction in the number of routing hops.

As previously described, IDs can be assigned using the "<" (less than) relation defined over a sufficiently large, bounded set of natural numbers, meaning its range is over a finite set of numbers between 0 and some fixed value, inclusive. Thus, every node participating in the federation is assigned a natural number that lies between 0 and some appropriately-chosen upper bound, inclusive. The range does not have to be tight and there can be gaps between numbers assigned to nodes. The number assigned to a node serves as its identity in the ring. The mapping function accounts for gaps in the number space by mapping a number falling in between two node identities to the node whose identity is numerically closest to the number.

This approach has a number of advantages. By assigning each node a uniformly-distributed number, there is an increased likelihood that all segments of the ring are uniformly populated. Further, successor, predecessor, and neighborhood computations can be done efficiently using modulo arithmetic.

In some embodiments, federating nodes are assigned an ID from within an ID space so large that the chances of two nodes being assigned the same ID are highly unlikely (e.g., when random number generation is used). For example, a node can be assigned an ID in the range of 0 to $b^n-1$, where b equals, for example, 8 or 16 and n equals, for example, 128-bit or 160-bit equivalent digits. Accordingly, a node can be assigned an ID, for example, from a range of 0 to $16^{40}-1$ (or approximately 1.461502E48). The range of 0 to $16^{40}-1$ would provide, for example, a sufficient number of IDs to assign every node on the Internet a unique ID.

Thus, each node in a federation can have:
An ID which is a numerical value uniformly distributed in the range of 0 to $b^n-1$ and
A routing table consisting of (all arithmetic is done modulo $b^n$):
Successor node (s);
Predecessor node (p);

---

Neighborhood nodes $(p_k, \ldots, p_1, p, s, s_1, \ldots, s_j)$ such that
$s_j.\text{s.id} > (\text{id} + u/2)$, $j \geq v/2-1$, and $p_k.\text{p.id} < (\text{id} - u/2)$, and $k \geq v/2-1$; and
Routing nodes $(r_{-(n-1)}, \ldots, r_{-1}, r_1, \ldots, r_{n-1})$ such that $r_{\pm i} = \text{RouteNumerically}(\text{id} \pm b^i, \text{Msg})$.

--- where b is the number base, n is the field size in number of digits, u is the neighborhood range, v is the neighborhood size, and the arithmetic is performed modulo $b^n$. For good routing efficiency and fault tolerance, values for u and v can be $u=b$ and $v \geq \max(\log_2(N), 4)$, where N is the total number of nodes physically participating in the federation. N can be estimated from the number of nodes present on a ring segment whose length is greater than or equal to b, for example, when there is a uniform distribution of IDs. Typical values for b and n are b=8 or 16 and n=128-bit or 160-bit equivalent digits.

Accordingly, routing nodes can form a logarithmic index spanning a ring. Depending on the locations of nodes on a ring, a precise logarithmic index is possible, for example, when there is an existing node at each number in the set of id±b$^i$ where i=(1, 2, . . . (n−1)). However, it may be that there are not existing nodes at each number in the set. In those cases, a node closest to id±b$^i$ can be selected as a routing node. The resulting logarithmic index is not precise and may even lack unique routing nodes for some numbers in the set.

Referring again to FIG. 2, FIG. 2 illustrates an example of a binary relation between nodes in a federation infrastructure in the form of sorted list 204 and corresponding ring 206. The ID space of sorted list 204 is in the range 0 to 2$^8$−1 (or 255). That is, b=2 and n=8. Thus, nodes depicted in FIG. 2 are assigned IDs in a range from 0 to 255. Sorted list 204 utilizes a binary relation that is reflexive, anti-symmetric, transitive, total, and defined over the domain of node identities. Both ends of sorted list 204 are joined, thereby forming ring 206. This makes it possible for each node in FIG. 2 to view itself as being at the middle of sorted list 204. The sorted list 204 is doubly linked so that any node can traverse the sorted list 204 in either direction. Arithmetic for traversing sorted list 204 (or ring 206) is performed modulo 2$^8$. Thus, ID 255 (or the end of sorted list 204)+1=0 (or the beginning of sorted list 204).

The routing table indicates that the successor to ID 64 is ID 76 (the ID immediately clockwise from ID 64). The successor can change, for example, when a new node (e.g., with an ID of 71) joins or an existing node (e.g., ID 76) leaves the federation infrastructure. Likewise, the routing table indicates that the predecessor to ID 64 is ID 50 (the ID immediately counters clockwise from ID 64). The predecessor can change, for example, when a new node (e.g., with an ID of 59) joins or an existing node (e.g., ID 50) leaves the federation infrastructure.

The routing table further indicates that a set of neighborhood nodes to ID 64 have IDs 83, 76, 50 and 46. A set of neighbor nodes can be a specified number of nodes (i.e., neighborhood size v) that are within a specified range (i.e., neighbor range u) of ID 64. A variety of different neighborhood sizes and neighbor ranges, such as, for example, V=4 and U=10, can potentially be used to identify the set of neighborhood nodes. A neighborhood set can change, for example, when nodes join or leave the federation infrastructure or when the specified number of nodes or specified range is changed.

The routing table further indicates that ID 64 can route to nodes having IDs 200, 2, 30, 46, 50, 64, 64, 64, 64, 76, 83, 98, 135, and 200. This list is generated by identifying the node closest to each number in the set of id±2$^i$ where i=(1, 2, 3, 4, 5, 6, 7). That is, b=2 and n=8. For example, the node having ID 76 can be identified from calculating the closest node to 64+2$^3$ or 72.

A node can route messages (e.g., requests for access to resources) directly to a predecessor node, a successor node, any node in a set of neighborhood nodes, or any routing node. In some embodiments, nodes implement a numeric routing function to route messages. Thus, RouteNumerically(V, Msg) can be implemented at node X to deliver Msg to the node Y in the federation whose ID is numerically closest to V, and return node Y's ID to node X. For example, the node having ID 64 can implement RouteNumerically(243, Msg) to cause a message to be routed to the node having ID 250. However, since ID 250 is not a routing node for ID 64, ID 64 can route the message to ID 2 (the closest routing node to ID 243). The node having ID 2 can in turn implement RouteNumerically (243, Msg) to cause the message to be routed (directly or through further intermediary nodes) to the node having ID 250. Thus, it may be that a RouteNumerically function is recursively invoked with each invocation routing a message closer to the destination.

Using Replicated Timers On A Ring Overlay Network

Figure 3A:
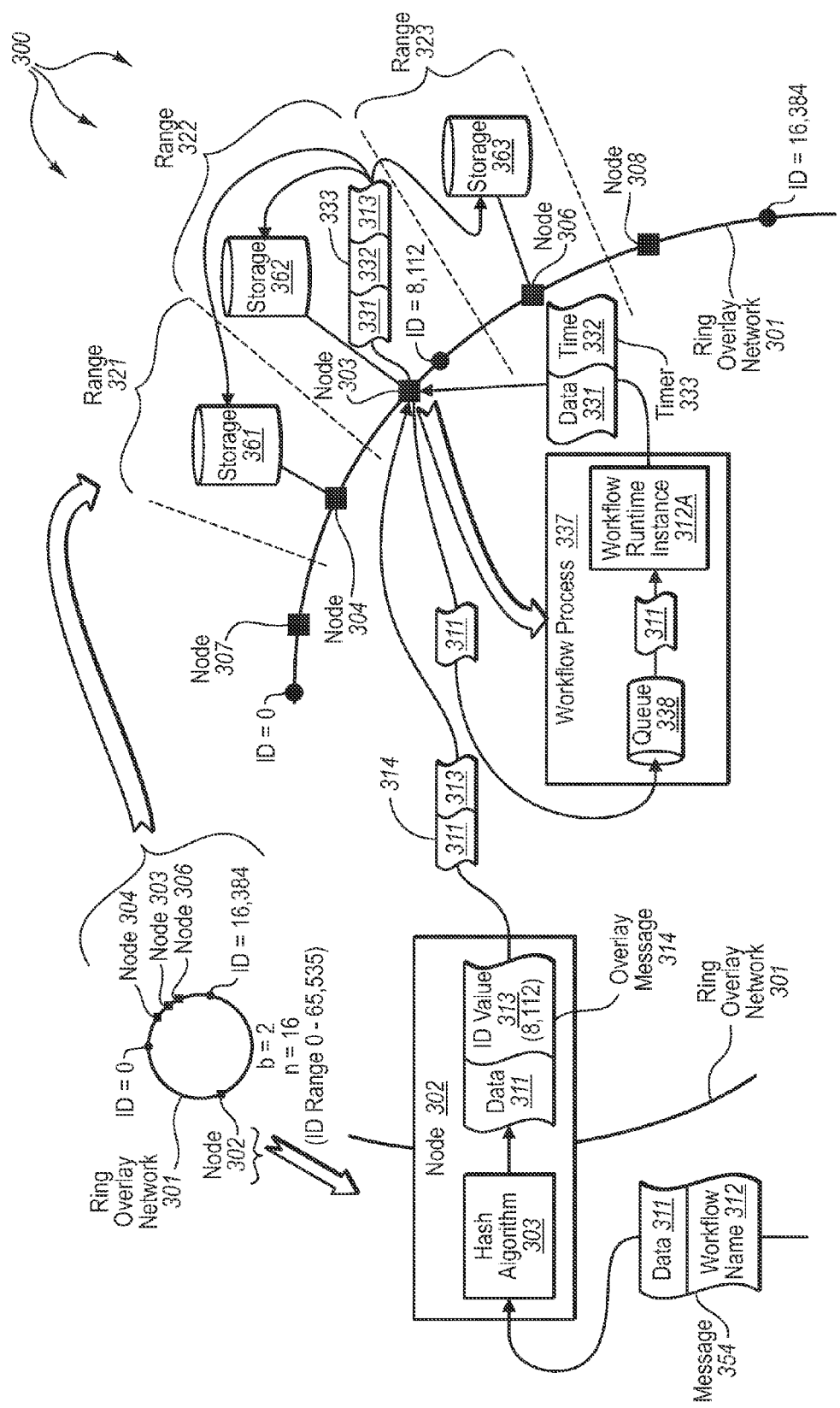
FIG. 3A illustrates an example computer architecture that facilitates replicating timers on a ring overlay network.

FIG. 3A illustrates example computer architecture 300 that facilitates replicating timers on ring overlay network 301. The ID space of ring overlay network 301 is 2$^{16}$, or 0-65,535. Ring overlay network 301 includes a plurality of nodes distributed across the ID space of ring overlay network 301, including at least nodes 302, 303, 304, 306, 307 and 309. Nodes in ring overlay network 301 can be assigned responsibility for sub ranges of ID values between 0 and 65,535. For example, nodes 304, 303, and 306 are assigned responsibility for ranges 321, 322, and 323 respectively. Nodes on ring overlay network 301 can also be backed by durable storage. For example, nodes 304, 303, and 306 are backed by durable storage 361, 362, and 363 respectively.

Node 302 can function as one of one or more front end nodes into ring overlay network 301. Node 302 can receive messages from systems external to ring overlay network 301. Received messages can include data and the name of process provided by ring overlay network 301. For example, message 354 includes data 311 and workflow name 312. Message 354 represents that data 311 is to be sent to an instance of the workflow identified by workflow name 312.

Node 302 can utilize hash algorithm 303 to hash process names into ID values on ring overlay network 301. For example, node 302 can use hash algorithm 303 to hash workflow name 312 into ID value 313 (ID=8,112). Node 302 can then formulate overlay message 314 to include data 311 and ID value 313.

As depicted, ID=8,112, is within range 322. Thus, node 303 is assigned responsibility for processing messages sent to ID=8,112. Accordingly, routing protocols can be used to route overlay message 314 through one or more nodes on overlay ring network 301 and eventually to node 303.

Node 303 can receive overlay message 314. In response to receiving overlay message 314, node 303 (if appropriate, activates workflow process 337 and) sends data 311 to workflow process 337. Data 311 can be temporarily queued in queue 338 before being dequeued to workflow runtime instance 312A (an instance of workflow name 312). Workflow runtime instance 312A can process data 311 to partially complete a portion of work related to workflow name 312.

During processing, workflow runtime instance 312A can determine that it is to sleep for some period of time (e.g., to wait to receive further data, to wait to generate further data, etc.) before again awakening to process data. Upon determining it is to sleep, workflow runtime instance 312A can generate a timer and send the timer to node 303. Workflow runtime instance 312A can then go to sleep. The timer can include a designated time when workflow runtime instance 312A is to be awakened along with data that is to be sent to workflow runtime instance 312A when it is awakened.

For example, workflow runtime instance can send timer 333 to node 303. Timer 333 includes data 331 and time 332. Time 332 is a designated time when workflow runtime instance 312A is to be awakened. Node 303 can supplement timer 333 with ID value 313. Node 313 can use ID value 313 for subsequent confirmation that timer 333 corresponds to workflow runtime instance 312A.

Node 303 can track time 332 relative to a corresponding clock. When the clock reaches time 332, node 303 refers to timer 333 to determine if it is responsible for timer 333. For example, node 303 can determine if it is (still) assigned responsibility for ID value 313 (ID=8,112). If so, node 303 wakes workflow runtime instance 312A and sends data 331 (either from memory or durable storage 109) to workflow process 337.

After temporarily queueing in queue 338, data 331 can be dequeued to workflow runtime instance 312A. Workflow runtime instance 312A can process data 331 to continue a portion of work related to workflow name 312. Node 303 also stores timer 333 to durable storage 362. Thus, if node 303 crashes, is rebooted, or otherwise loses state in volatile memory, node 303 can retrieve timer 333 upon returning to normal operations.

Additionally, node 303 replicates timer 333 to one or more other nodes in ring overlay network 301. Node 303 can utilize appropriate routing protocols to send messages containing timer 333 to ID values assigned to the one or more other nodes. For example, node 303 send timer 333 to ID values in ranges 321 and 323 to replicate timer 333 to nodes 304 and 306 respectively. Upon receiving a replicated timer, a receiving node can begin tracking the designated time in the timer relative to a clock. For example, nodes 304 and 306 can begin tacking time 332 relative to corresponding clocks in response to receiving 333.

A node receiving a replicated timer can also store the timer in durable storage. For example, node 304 can store timer 333 in durable storage 361 and node 306 can store timer 333 in durable storage 363. Thus, if either of nodes 304 or 306 crash, are rebooted, or otherwise loses state in volatile memory, they can retrieve timer 333 upon returning to normal operations.

When a clock reaches time 332, node 304 and/or 306 refers to timer 332 to determine if it is responsible for timer 333. For example, node 304 and/or 306 can each determine if they are (now) assigned responsibility for ID value 313 ID=8,112. When a node is not responsible for a timer, the node does not attempt to wake up or send data to a process corresponding to the timer. For example, when node 303 is assigned responsibility for ID value 313 (ID=8,112), neither node 304 nor node 306 attempts to activate or send data 331 to a workflow instance for workflow name 312.

On the other hand, if node 304 or 306 are responsible ID value 313 (ID=8,112), node 304 or 306 activates a process or sends data 331 as appropriate. This can occur when a timer expires after re-assignment or when re-assignment occurs and it is then detected that a timer previously expired.

Figure 4:
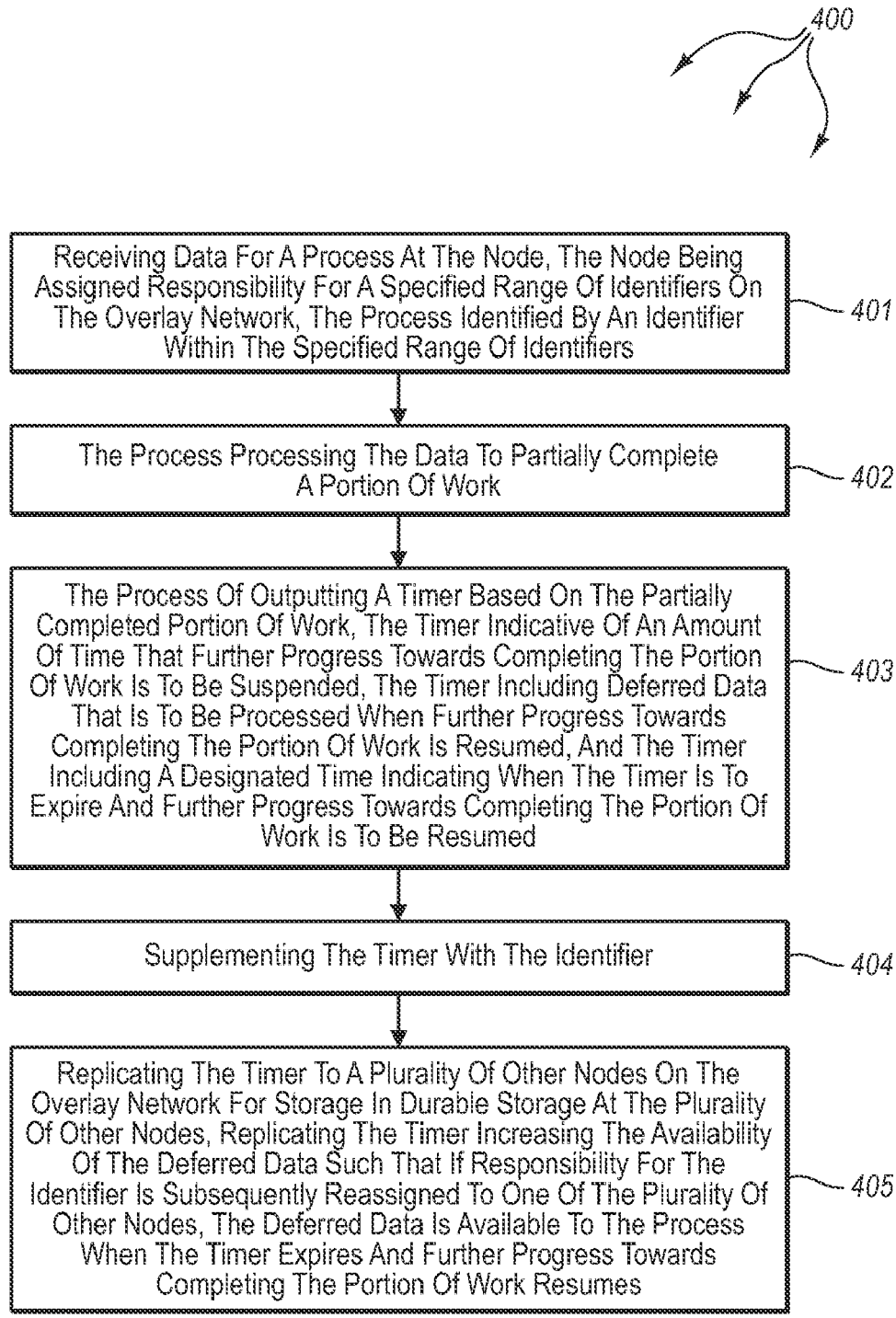
FIG. 4 illustrates a flow chart of an example method for replicating timers within the overlay network.

FIG. 4 illustrates a flow chart of an example method 400 for replicating timers within the overlay network. Method 400 will be described with respect to the components and data in FIG. 3A.

Method 400 includes an act of receiving data for a process at the node, the node being assigned responsibility responsible for a specified range of identifiers on the overlay network, the process identified by an identifier within the specified range of identifiers (act 401). For example, node 303 can receive overlay message 314 including data 311 and ID value 313 (ID=8,112). Node 303 is responsible for range 322 and ID value 313 (ID=8,112) is within range 322.

Method 400 includes an act of the process processing the data to partially complete a portion of work (act 402). For example, node 303 can send data 311 to workflow process 337. After temporarily queueing in queue 338, data 311 can be dequeued to workflow runtime instance 312A. Workflow runtime instance 312A can process data 311 to perform work related to workflow name 312.

Method 400 includes an act of the process outputting a timer based on the partially completed portion of work, the timer indicative of an amount of time that further progress towards completing the portion of work is to be suspended, the timer including deferred data that is to be processed when further progress towards completed in the portion of work resumes and the timer including a designated time indicating when the timer is to expire and progress towards completed in the portion of work is to be resumed (act 403). Resuming progress can include using timer expiration as an indication (or event) to another component or using timer expiration to activate a dormant process. For example, workflow runtime instance 312A can output timer 333. Timer 333 is indicative of an amount of time workflow runtime instance 312 is to sleep before again awakening to process data. Timer 333 includes data 331 that is to be processed when workflow runtime instance 312 awakens. Timer 333 also includes time 332, designating a time when workflow runtime instance 312 is to be awakened Method 400 includes an act of supplementing the timer with the identifier (act 404). For example, node 303 can supplement timer 333 with ID value 313 (ID=8,112).

Method 400 includes an act of replicating the timer to a plurality of other nodes on the overlay network for storage in durable storage at the plurality of other nodes, replicating the timer increasing the availability of the deferred data such that if responsibility for the identifier is subsequently reassigned to one of the plurality of other nodes, the deferred data is available to the process when the timer expires and further progress towards completing the portion of work is to resume (act 405). For example, node 303 can replicate timer 333 to nodes 304 and 306 for storage in durable storage 361 and 363 respectively. Replicating timer 333 increases the availability of data 331. Accordingly, if responsibility for ID value 313 (ID=8,112) is subsequently reassigned from node 303 to either of nodes 304 or 306, data 311 is available to a workflow runtime instance at either node 304 or 306 at time 332.

As such, it may be that responsibility for ID value 313 (ID=8,112) (and thus responsibility for workflow name 312) changes after workflow runtime instance 312A issues timer 333. For example, when the node configuration in ring overlay network 301 changes, identifier assignment protocols can re-assign responsibility for different sub ranges of the ID range 0-65,535. For example, when a node joins overly network 301, portions of existing identifier ranges for one or more existing nodes can be re-assigned from the one or more existing nodes to the joining node. Likewise, when a node departs from ring overlay network 301, portions of the identifier range assigned to the leaving node can be re-assigned to one or more remaining nodes.

Figure 3B:
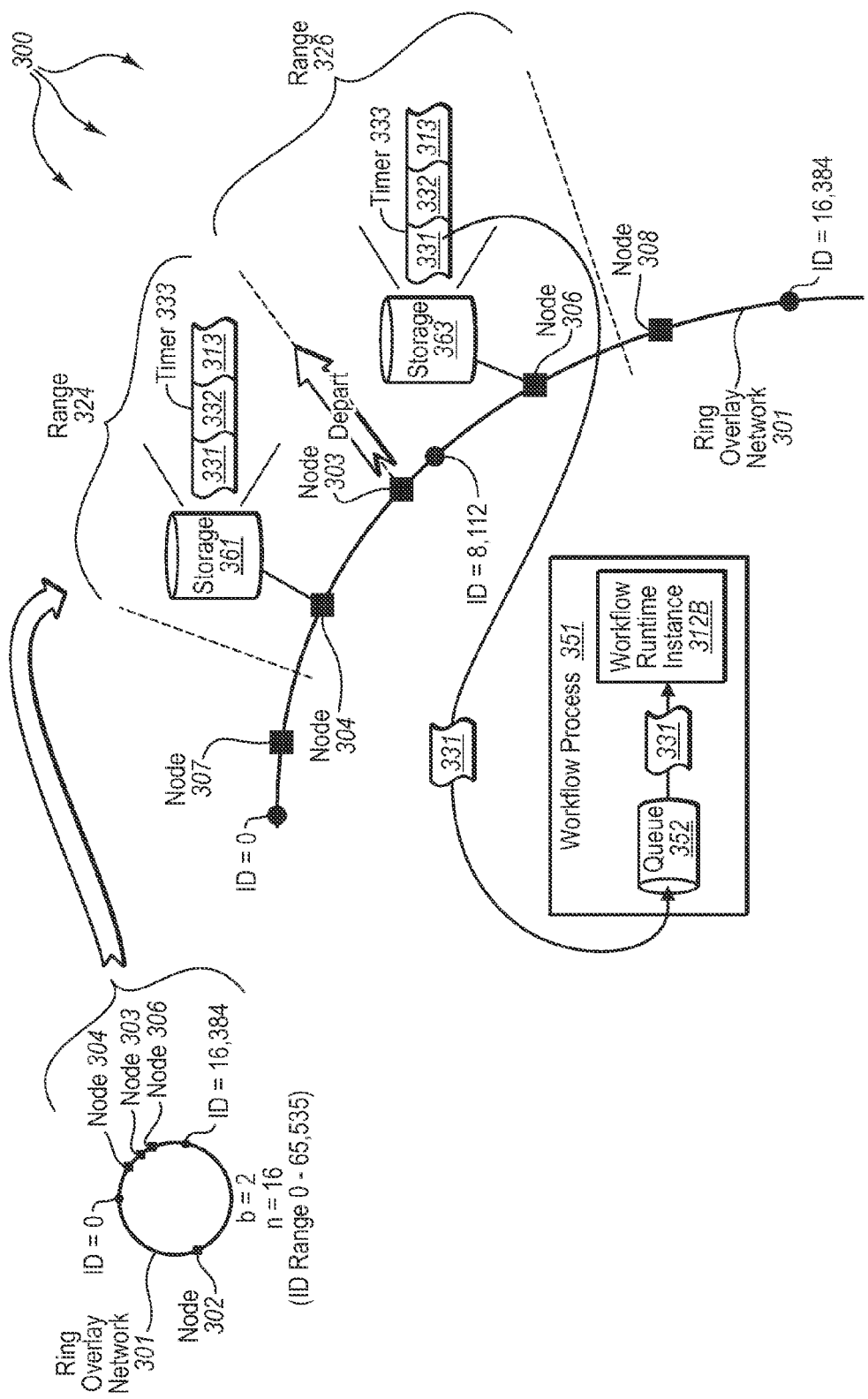
FIG. 3B illustrates an example computer architecture that facilitates assuming ownership of a replicated timer on a ring overlay network.

FIG. 3B illustrates example computer architecture 300 that facilitates assuming ownership of a process within ring overlay network 301. For example, if node 303 departs ring overlay network 301 (either in an orderly manner or due to a malfunction (crash, loss of power, etc.)), portions of identifier range 322 can be re-assigned to other remaining nodes, such as, for example, nodes 304 and 306. Referring now to FIG. 3B, node 303 departs ring overlay network 301. Nodes in overlay network 301 can receive an appropriate depart message indicating that node 303 has departed.

In response to the departure of node 303, identifier assignment protocols re-assign responsibility for range 322. Responsibility for range 322 is split between nodes 304 and 306. Thus, node 304 is assigned responsibility for part of range 322 and node 306 is assigned responsibility for part of range 322. For example, range 324 can include range 321+ part of range 322 and range 326 can include range 323 plus a part of range 322. As depicted in FIG. 3B, ID value 313 (ID=8,112) is in range 326 and is thus now the responsibility of node 306.

It may be that a clock for node 306 reaches time 332 subsequent to node 306 being re-assigned responsibility for ID value 313 (ID=8,112). When the clock reaches time 332, node 306 refers to timer 333 to determine if it is responsible for timer 333. For example, node 306 can determine that it is (now) assigned responsibility for ID value 313 (ID=8,112). As such, node 306 can activate queue 352 and workflow runtime instance 312B (another instance of workflow name 312) within workflow process 351. Node 306 can then send data 331 to workflow process 351. After temporarily queueing in queue 352, data 331 can be dequeued to workflow runtime instance 312B. Workflow runtime instance 312B can process data 331 to perform further work related to workflow name 312, for example, continuing work started by workflow runtime instance 312A.

On the other hand, it may be that a clock for node 306 reaches time 332 prior to node 306 being re-assigned responsibility for sub range ID value 313 (ID=8,112). Thus, upon re-assignment of ID value 313 (ID=8,112) to node 306, node 306 determines (e.g., either through checking periodically or through notification of re-assign responsibilities) that time 332 has already passed. In response, to the determination node 332 activates queue 352 and workflow runtime instance 312B (another instance of workflow name 312) within workflow process 351. After temporarily queueing in queue 352, data 331 can be dequeued to workflow runtime instance 312B. Workflow runtime instance 312B can process data 331 to perform further work related to workflow name 312, for example, continuing work started by workflow runtime instance 312A.

Figure 5:
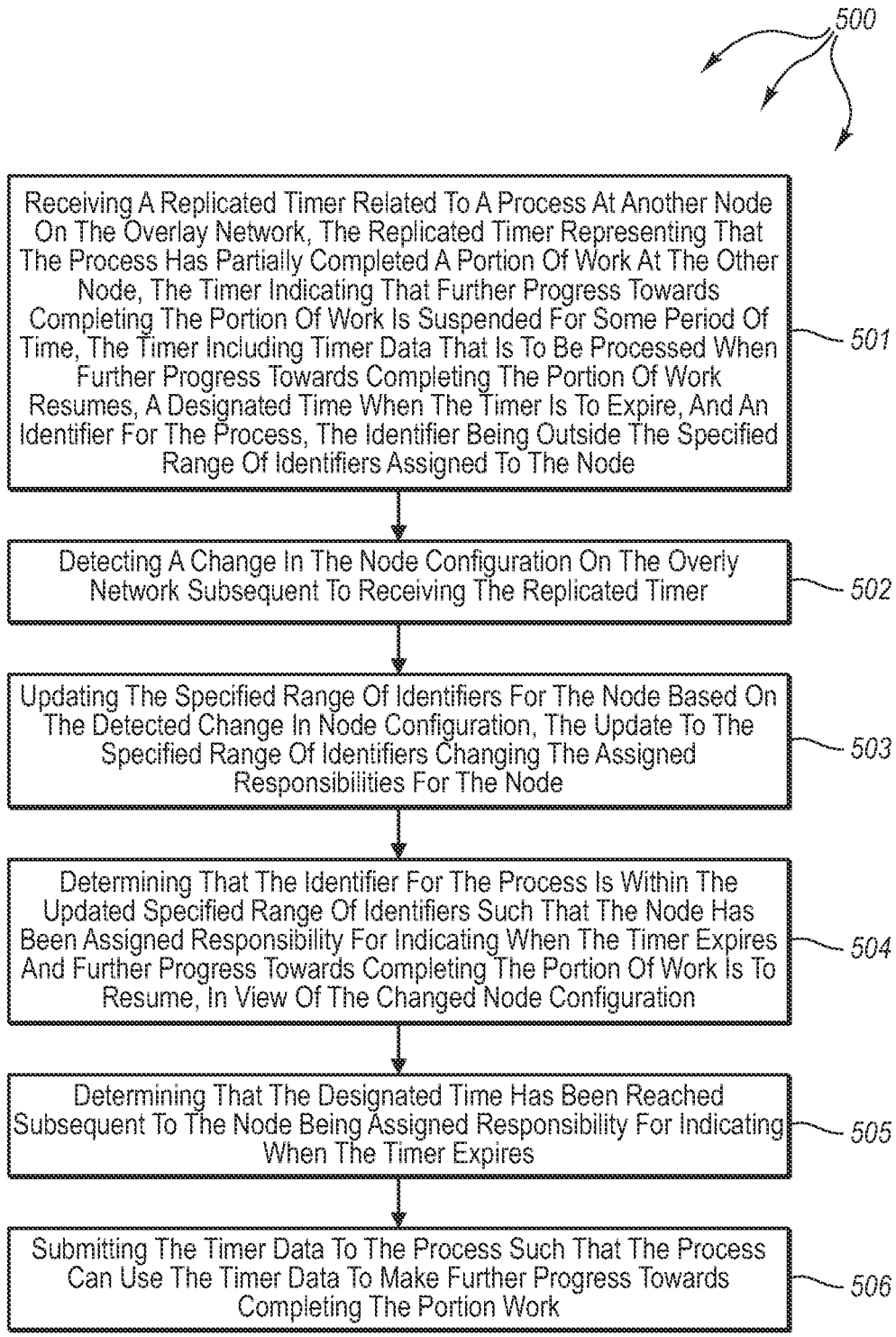
FIG. 5 illustrates a flow chart of an example method for assuming ownership of a replicated timer within an overlay network.

FIG. 5 illustrates a flow chart of an example method 500 for assuming ownership of a process within an overlay network. Method 500 will be described with respect to the components and data in FIGS. 3A and 3B.

Method 500 includes an act of an act of receiving a replicated timer related to a process at another node on the overlay network, the replicated timer representing that the process has partially completed a portion of work at the other node, the timer indicating that further progress towards completing the portion of work is suspended for some period of time, the timer including timer data that is to be processed when further progress towards completing the portion of work resumes, a designated time when the timer is to expire and further progress towards completing the portion of work is to resume, and an identifier for the process, the identifier being outside the specified range of identifiers assigned to the node (act 501). For example, node 306 can receive replicated timer 333 corresponding to workflow runtime instance 312A. Timer 333 represents that the workflow runtime instance 312A has partially completed a portion of work node 303. Timer 333 indicates that workflow runtime instance 312A is to sleep for some period of time before awakening to process data. Timer 333 includes data 331, time 332, and ID value 313.

Data 331 is data that is to be processed a workflow runtime instance 312A when workflow runtime instance 312A awakens. Time 332 represents a designated time when workflow runtime instance 312A is to be awaken. ID value 313 is the identifier for workflow name 312. Upon receiving timer 333 at node 306, ID value 313 is outside of range 323.

Method 500 includes an act of detecting a change in the node configuration on the overly network subsequent to receiving the replicated timer (act 502). For example, node 306 can detect that node 303 has departed ring overlay network 303.

Method 500 includes an act of updating the specified range of identifiers for the node based on the detected change in node configuration, the update to the specified range of identifiers changing the assigned responsibilities for the node (act 503). For example, range 323 can be updated to include a portion of range 322, resulting in range 326 (and including ID value 313 (ID=8,112). The ID values in range 326 differ from the ID values in range 322. As such, the assigned responsibilities for node 306 are changed.

Method 500 includes an act of determining that the identifier for the process is within the updated specified range of identifiers such that the node has been assigned responsibility for when the timer expires and further progress towards completing the portion of work is to resume n view of the changed node configuration (act 504). For example, node 306 can determine that ID value 313 (ID=8,112) is within range 326. Accordingly, node 306 has been assigned responsibility for indicating when timer 333 expires and processing data 331 can occur, in view of node 303 departing ring overly network 301.

Method 500 includes an act of determining that the designated time has been reached subsequent to the node being assigned responsibility for indicating when the timer is to expire (act 505). For example, node 306 can determine that a corresponding clock has reached time 332 subsequent to node 306 being assign responsibility for range 326. Alternately, it may be determined that time 332 was reached prior to node 306 being assigned responsibility for range 326.

In either event, method 500 includes an act of submitting the timer data to the process such that the process can use the timer data to make further progress towards completing the portion of work (act 506). For example, node 306 can locally activate queue 352 and workflow runtime instance 312B (another instance of workflow name 312) within process 351. Queue 352 and workflow runtime instance 312B can be activated in response to determining that time 332 has been reached and that node 306 is responsible for workflow name 312. Node 306 can then submit data 331 to workflow process 351.

Thus in some embodiments, after temporarily queueing in queue 352, data 331 can be dequeued to workflow runtime instance 312B. Workflow runtime instance 312B can process data 331 to continue a portion of work from the point of partial completion reached by workflow runtime instance 312A.

Alternately, node 306 can indicate to another node that timer 333 has expired. In response to the indication (event), the other node reacts by performing various computing activities, including potentially performing work based on data 331.

Communication between nodes in an overlay network can occur in a variety of different ways. As previously described, routing protocols can be used to route messages between nodes in an overlay network. In some embodiments, messages are routed between nodes without routing consistency. In other embodiments, messages are routed between nodes with routing consistency.

Routing in Accordance with Cached Agreements

For example, in embodiments that use routing consistency, messages can be routed in accordance with cached routing agreements to facilitate routing consistency. Adjacent nodes of a ring (or other overlay network) can agree to a division of responsibility for a range of unoccupied identifiers between the adjacent nodes. An identifier can be unoccupied for any number of reasons. For example, an identifier may be unoccupied because the identifier is unassigned (i.e., the identifier that has not been assigned to a node). For assigned identifiers (i.e., identifiers that have been assigned to a node), an identifier may be unoccupied because the corresponding node has been deliberately shutdown or the node is for some reason, such as, for example, due to communication or node failures, otherwise unreachable.

Routing agreements between nodes can be established and cached prior to nodes being permitted to accept messages for and deliver messages for any of the unoccupied identifiers that are to be the responsibility of the adjacent nodes. Reference to a cached routing agreement significantly reduces any communication between (potentially) adjacent nodes that may otherwise occur to determine which node is responsible for a specific unoccupied identifier.

A cached routing agreement can divide a range of unoccupied identifiers in an arbitrary fashion, in accordance with configurable rules, or in accordance with a fixed methodology. In some embodiments, a range of identifiers between adjacent nodes on a ring is divided essentially in half This reduces the likelihood of an unoccupied identifier being further from a node that is responsible for the unoccupied identifier.

When there is an even number of unoccupied identifiers between adjacent nodes, the midway point between the adjacent nodes is between unoccupied identifiers. Thus, responsibility for the unoccupied identifiers can be divided at the midway point between the adjacent nodes. Accordingly, each adjacent node can be assigned responsibility for an equal number of unoccupied identifiers.

On the other hand, when there is an odd number of unoccupied identifiers between adjacent nodes, the midway point between the adjacent nodes is at an unoccupied identifier. Thus, responsibility for the unoccupied identifiers can be divided at one side or the other of the unoccupied identifier that is the midway point. Accordingly, one adjacent node can be assigned responsibility for one more unoccupied identifier than the other adjacent node.

Figure 6A:
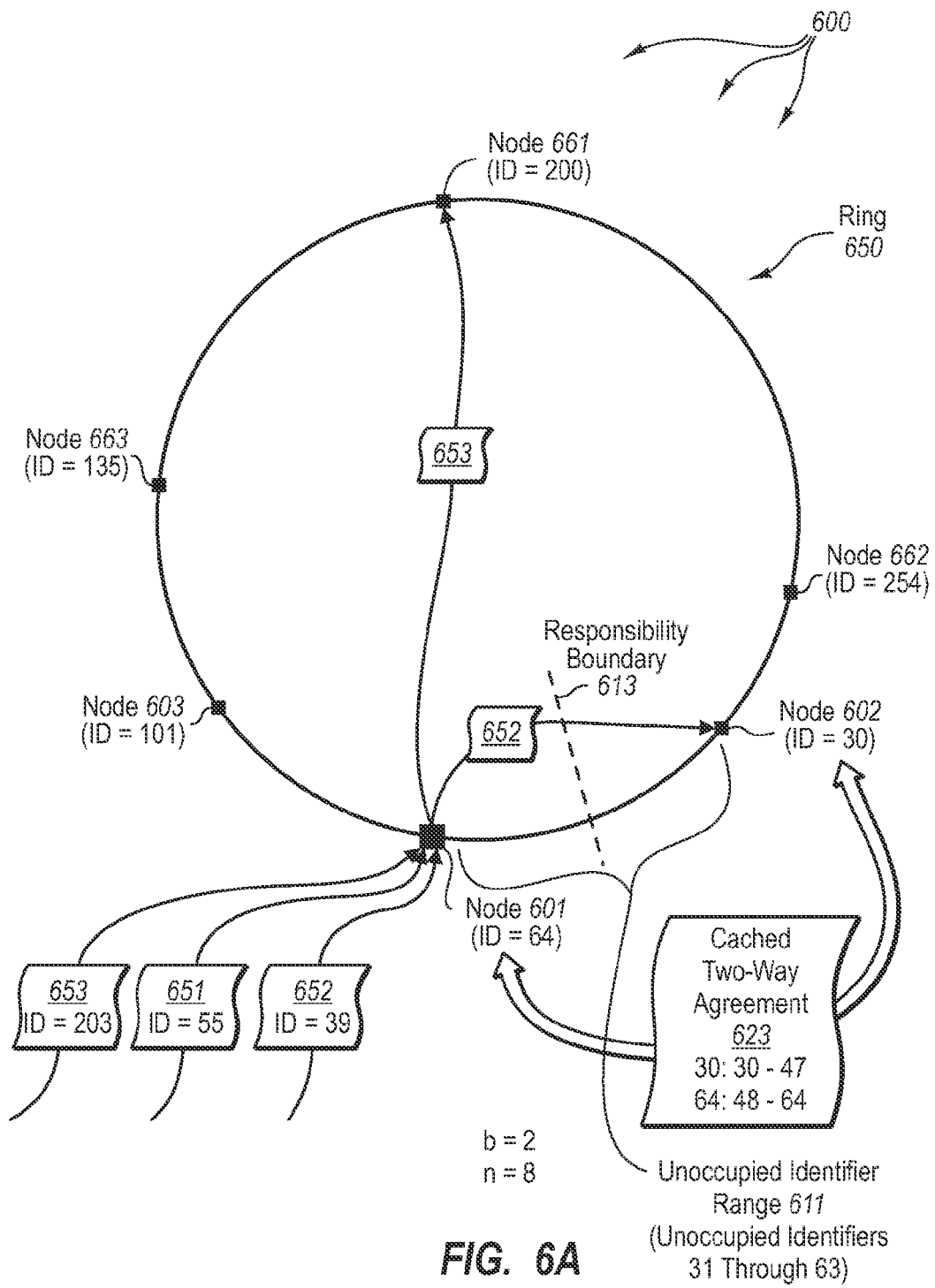
FIG. 6A illustrates an example ring architecture that facilitates routing a message in accordance with a cached two-way agreement.

Single two-way agreements: For example, referring now to FIG. 6A, FIG. 6A illustrates an example ring architecture 600 that facilitates routing a message in accordance with a cached two-way agreement between nodes. As depicted, various nodes (shown as squares on ring 650) including (but not limited to) nodes 601, 602, 603, 661, 662, and 663 are included on ring 650. Each node has a corresponding ID (shown in parenthesis) indicating its position on ring 650. For example, node 601 has ID=64 and node 602 has ID=30.

There are ranges of unoccupied identifiers between the depicted nodes. For example, unoccupied identifier range 611 represents unoccupied identifiers 31 through 63 between nodes 602 and 601.

As depicted, node 601 and 602 have established and cached two-way agreement 623. For example, through prior communication, nodes 601 and 602 can determine that there are no other nodes currently interspersed between ID=64 and ID=30. Thus, nodes 601 and 602 can further determine that they are adjacent to one another on ring 650. Accordingly, node 601 and 602 can divide responsibility for unoccupied identifier range 611 (i.e., unoccupied identifiers 31 through 63) such that node 602 is responsible for a portion of unoccupied identifier range 611 and node 601 is responsible for the remaining portion unoccupied identifier range 611. Each node is also responsible for its assigned ID. That is, node 602 is responsible for ID=30 and node 601 is responsible for ID=64.

Accordingly, as depicted by responsibility boundary 613 (between unoccupied identifier 47 and unoccupied identifier 48), node 602 (ID=30) is responsible for itself as well as unoccupied identifiers 31 through 47 and node 601 (ID=64) is responsible for itself as well as unoccupied identifiers 48 through 63. Although the midway point between nodes 601 and 602 is at unoccupied identifier 47, node 802 is assigned responsibility for unoccupied identifier 47 such that each unoccupied identifier is the responsibility of a single node. Thus, as previously described, when a responsibility boundary falls on an unoccupied identifier, one of the adjacent nodes can be assign the sole responsibility for the unoccupied identifier.

In some embodiments, a message is routed in accordance with a cached two-way agreement. A receiving node receives a message along with a destination identifier indicating a destination on the ring of nodes, the destination identifier located between the receiving node and one of the immediate neighbor nodes. For example, node 601 can receive message 651, indicated for delivery to ID=55. Alternately, node 601 can receive message 652, indicated for delivery to ID=39. Message 651 and 652 can be received from another node in ring 650 (intra-ring communication), from a node in another ring of ring architecture 600 (inter-ring communication), or through non-ring communication.

The receiving node refers to a cached two-way agreement between the receiving node and the immediate neighbor node to determine the next appropriate node that is to receive the message. The two-way agreement at least implies a division of responsibility for the identifier space between the receiving node and an immediate neighbor node. For example, node 601 can refer to cached two-way agreement 623 to determine the next appropriate node that is to process message 851. Since cached two-way agreement 623 indicates that node 801 (ID=64) is responsible for unoccupied identifier 55, node 601 determines that it is the appropriate node to process message 651. Likewise, node 601 can refer to cached two-way agreement 623 to determine the next appropriate node that is to process message 652. Since cached two-way agreement 623 indicates that node 602 (ID=30) is responsible for unoccupied identifier 39, node 601 determines that node 602 is the next appropriate node that is to process message 652.

The message is sent to the next appropriate component based on the determination of the next appropriate node. For example, node 601 can provide message 651 to its resource handler instance corresponding to unoccupied identifier 55, since cached two-way agreement 623 indicates that node 601 is responsible for unoccupied identifier 55. Alternately, node 601 can provide message 652 to node 602, since cached two-way agreement 623 indicates that node 602 is responsible for unoccupied identifier 39. Subsequently, node 602 can provide message 652 to its resource handler instance corresponding to unoccupied identifier 39.

When an identifier is not included in a cached two-way agreement, a node can refer to a routing table (e.g., as depicted in FIG. 2) to make progress towards a destination. For example, node 601 can send message 653, indicated for delivery to ID=203, to node 661 (ID=200). Node 661 can then refer to any cached two-way agreements with its adjacent nodes to determine the node that is responsible for identifier 203.

Figure 6B:
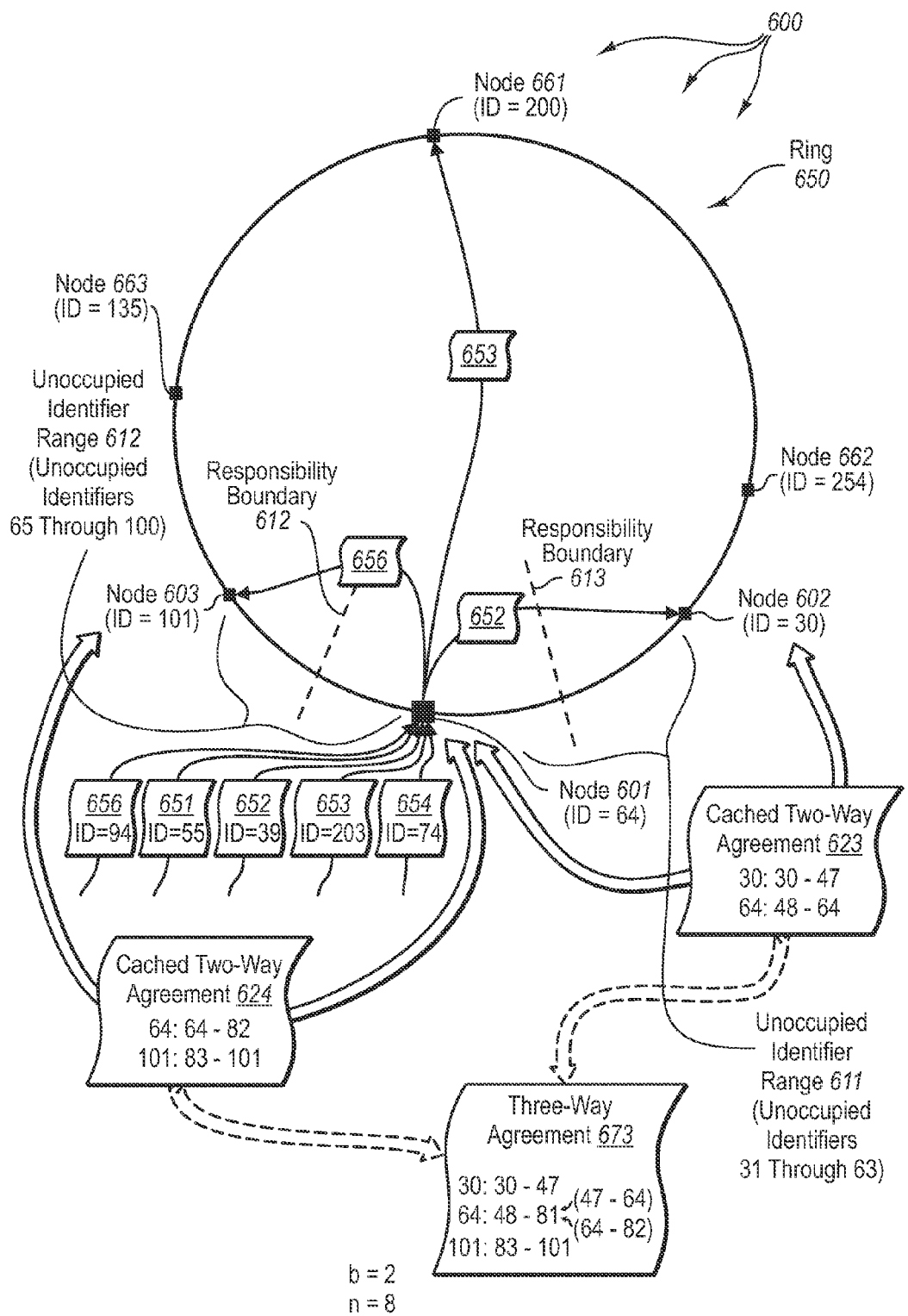
FIG. 6B illustrates an example ring architecture that facilitates routing a message in accordance with multiple cached two-way agreements.

Multiple two-way agreements: In some embodiments, multiple two-way agreements can, from the perspective of a given node, essentially represent a three-way agreement between the given node, the given node's immediate predecessor node, and the given node's immediate successor node. FIG. 6B illustrates the example ring architecture 600 that facilitates routing a message in accordance with multiple cached two-way agreements.

As previously described, nodes 601 and 602 can establish cached two-way agreement 623. Similarly, nodes 601 and 603 can establish cached-two way agreement 624 to divide responsibility for unoccupied identifier range 612 (i.e., unoccupied identifiers 65 through 101). Thus, through prior communication, nodes 601 and 603 can determine that there are no other nodes currently interspersed between ID=65 and ID=101. Thus, nodes 601 and 603 can further determine that they are adjacent to one another on ring 650. Accordingly, nodes 601 and 603 can divide unoccupied identifier range 612 such that node 602 is responsible for a portion of unoccupied identifier range 612 and node 601 is responsible for the remaining portion of unoccupied identifier range 612. Accordingly, as depicted within two-way agreement 624, node 601 (ID=64) is responsible for itself as well as unoccupied identifiers 65 through 82 and node 602 (ID=101) is responsible for itself as well as unoccupied identifiers range 83 through 100.

From the perspective of node 601, the combination of cached two-way agreement 623 and cached two-way agreement 624 essentially represents three-way agreement 673. That is, node 601 is responsible for a portion of identifier space between node 601 and node 602 and is responsible for a portion of identifier space between node 601 and node 603. The parenthetical ranges of identifiers indicate the ranges of responsibility (i.e., 47 through 64 and 64 through 82) form the cached-two way agreements 623 and 624 on either side of node 601.

In some embodiments, a message is routed in accordance with multiple cached two-way agreements. A receiving node receives a message along with a destination identifier indicating a destination on the ring of nodes. For example, node 601 can receive any of messages 651, 652, 653, 2254, and 656 indicated for delivery to ID=55, ID=39, ID=203, ID=74, and ID=94 respectively. Messages 651, 652, 653, 654, and 656 can be received from another node in ring 650 (intra-ring communication) or from a node in another ring of ring architecture 600 (inter-ring communication), or through non-ring communication.

Node 601 can refer to cached two-way agreements 623 and 624 to determine the next appropriate node that is to receive any of messages 651, 652, 653, 654, and 656. Thus, cached two-way agreements 623 and 624 at least imply a division of responsibility for the identifier space between the node 601 and node 602 and node 601 and node 603 respectively.

Since cached two-way agreement 623 indicates that node 602 (ID=30) is responsible for unoccupied identifier 39, node 601 determines that node 602 is the next appropriate node that is to process message 652. Since cached two-way agreement 623 indicates that node 601 (ID=64) is responsible for unoccupied identifier 55, node 601 determines that it is the appropriate node to process message 652. Since cached two-way agreement 624 indicates that node 601 (ID=64) is responsible for unoccupied identifier 74, node 601 determines that it is the appropriate node to process message 654. Since cached two-way agreement 624 indicates that node 603 (ID=101) is responsible for unoccupied identifier 94, node 601 determines that node 603 is the next appropriate node that is to process message 654.

The message is sent to the next appropriate component based on the determination of the next appropriate node. For example, node 601 can send messages 651, 652, 653, 654, and 656 to the next appropriate component on ring 650 based on the determination of the next appropriate node that is to process messages 651, 652, 653, 654, and 656.

For example, node 601 can provide message 652 to node 602, since cached two-way agreement 623 indicates that node 602 is responsible for unoccupied identifier 39. Subsequently, node 602 can provide message 652 to its resource handler instance corresponding to unoccupied identifier 39. Node 601 can provide message 651 to its resource handler instance corresponding to unoccupied identifier 55, since cached two-way agreement 623 indicates that node 601 is responsible for unoccupied identifier 55. Node 601 can provide message 654 to its resource handler instance corresponding to unoccupied identifier 74, since cached two-way agreement 624 indicates that node 601 is responsible for unoccupied identifier 74. Node 601 can provide message 656 to node 603, since cached two-way agreement 624 indicates that node 603 is responsible for unoccupied identifier 94. Subsequently, node 603 can provide message 656 to its resource handler instance corresponding to unoccupied identifier 94.

When an identifier is not included in a cached either of multiple cached two-way agreements, a node can refer to a routing table (e.g., as depicted in FIG. 2) to make progress towards a destination. For example, node 601 can send message 656, indicated for delivery to ID=203, to node 661 (ID=200). Node 661 can then refer to any cached two-way agreements with its predecessor node and/or its successor node to determine the next appropriate component that is to receive message 653.

Formulating Cached Agreements

Rings (as well as other types of overlay networks) can be reconfigured from time to time, such as, for example, when a new node joins or when an existing node departs (e.g., through graceful removal, as a result of node monitoring, through reference to an arbitrator, etc.). When a node detects that the configuration of a ring has changed, the node can reformulate cached routing agreements with any adjacent nodes. During agreement reformulation, the node can queue any received messages, expect those for formulating the agreement. After formulation of the agreement is complete, the node can then process the messages in accordance with the agreement.

Reconfiguration of a ring (or other overlay network) can cause multiple routing agreements to be reformulated. For example, when a node departs, adjacent nodes to the departing node can formulate an agreement for the range of unoccupied identifiers that were previously the responsibility of the departing node (thus potentially gaining responsibility for additional unoccupied identifiers). This reformulation joins responsibility for a portion of the range of unoccupied identifiers from the departing node with the range of unoccupied identifiers for each adjacent node. That is, each adjacent node may gain responsibility for a portion of the departing node's range of unoccupied identifiers and the departing node's identifier.

Figure 7A:
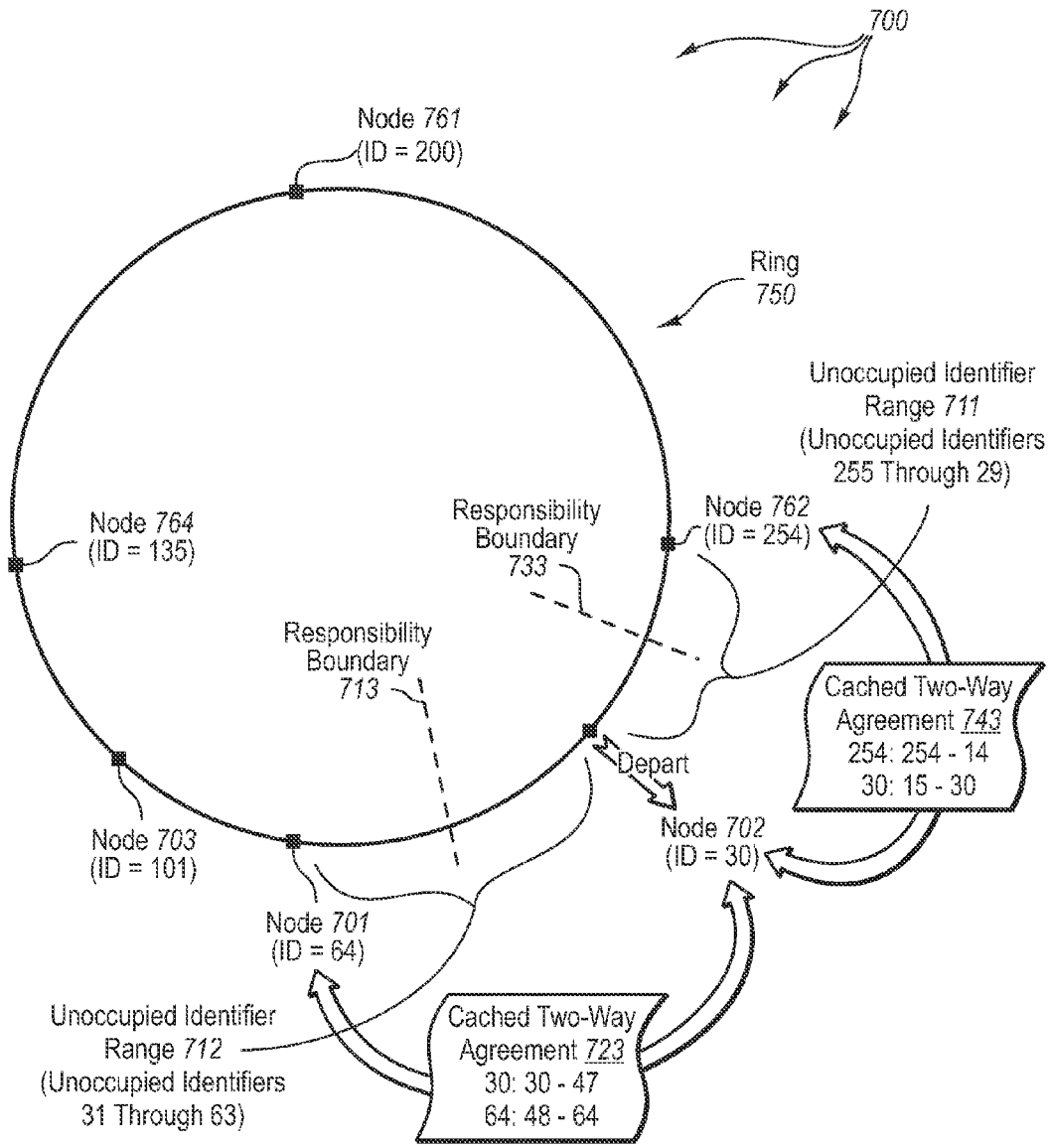
FIGS. 7A through 7D illustrate an example ring architecture that facilitates formulating a cached two-way agreement.

FIGS. 7A through 7D illustrate an example ring architecture 700 that facilitates formulating a cached two-way agreement. As depicted in FIG. 7A, nodes 701 and 702 have formulated cached two-way agreement 723 dividing responsibility for unoccupied identifier range 712 (i.e., unoccupied identifiers 31 through 63) at responsibility boundary 713 (between unoccupied identifier 47 and unoccupied identifier 48). Similarly, nodes 702 and 762 have formulated cached two-way agreement 743 dividing responsibility for unoccupied identifier range 711 (i.e., unoccupied identifiers 255 through 29) at responsibility boundary 733 (between unoccupied identifiers 14 and 15).

Figure 7B:
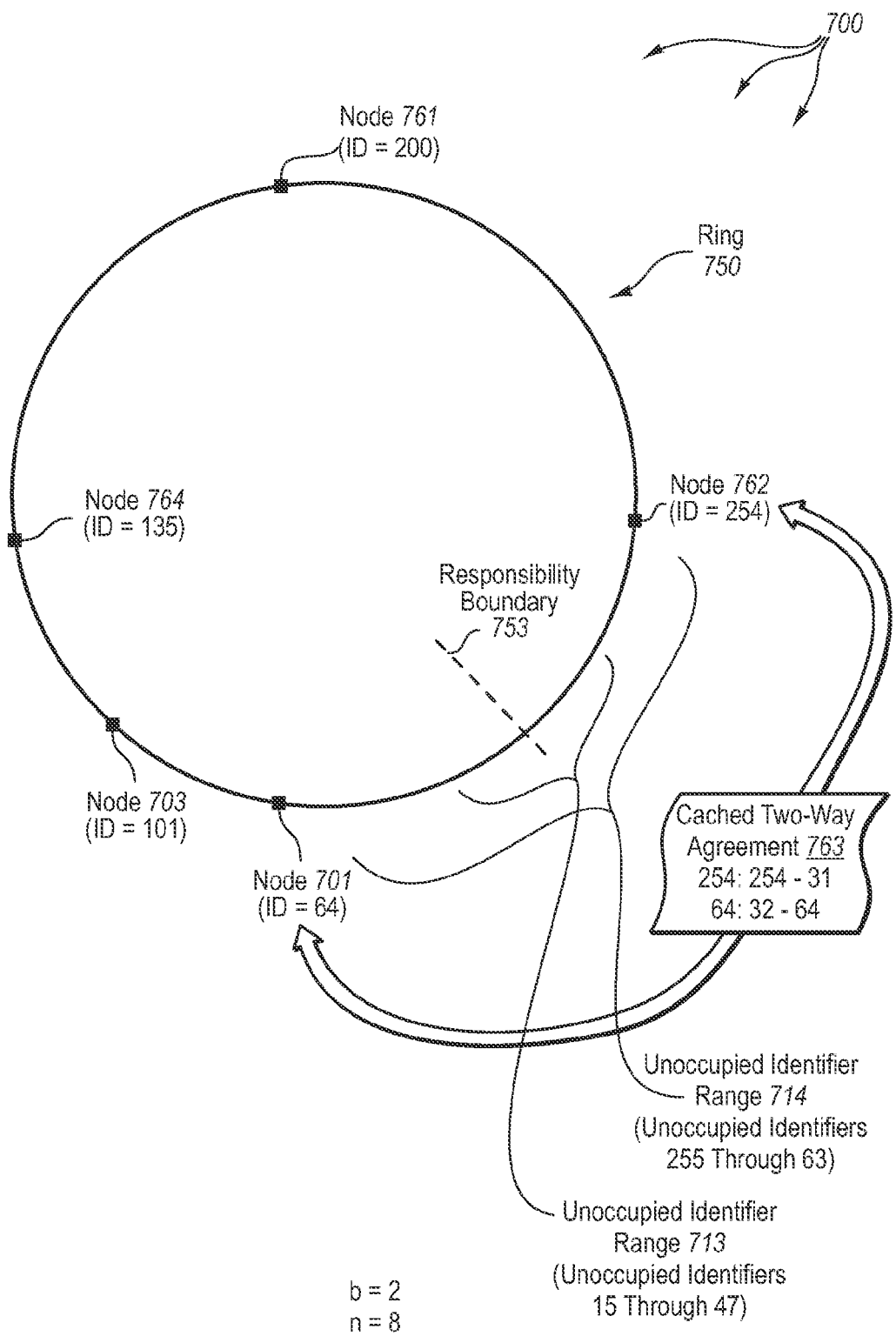

At some time subsequent to the formulation of cached two-way agreements 723 and 743, node 702 can leave ring 750 (e.g., through graceful removal, as a result of node monitoring, based on instructions from an arbitrator, etc.). Referring now to FIG. 7B, subsequent to node 702 leaving ring 750 there is no node responsible for the unoccupied identifiers that were previously the responsibility of node 702. Unoccupied identifier range 713 (unoccupied identifiers 15 through 47, including now unoccupied identifier 30) represents the range of unoccupied identifiers that node 702 was responsible for prior to departing ring 750.

In response to node 702 leaving ring 750, nodes 701 and 762 attempt to identify new immediate neighbor nodes. Node 762 attempts to identify a new immediate successor node (i.e., an immediate neighbor node in the same direction as node 702 relative to node 762). Node 701 attempts to identify a new immediate predecessor node (i.e., an immediate neighbor in the same direction as node 702 relative to node 701). In FIG. 7B, node 762 identifies node 701 as its new immediate successor and node 701 identifies node 762 as its new immediate predecessor.

Upon identifying new immediate neighbor nodes, nodes 762 and 701 formulate cached two-way agreement 763 to that divides responsibility for unoccupied identifier range 714 (unoccupied identifiers 255 through 63, including now unoccupied identifier 30). Unoccupied identified range 714 includes unoccupied identifier range 713, which was previously the responsibility of node 702. Thus, portions of unoccupied identifier range 713 can become the responsibility of either node 762 or node 701, after node 702 departs ring 750.

Accordingly, as depicted by responsibility boundary 753 (between unoccupied identifier 31 and unoccupied identifier 32), node 762 (ID=254) and node 701 (ID=30) formulate cached two-way agreement 763. In accordance with cached two-way agreement 763, node 762 (ID=254) is responsible for itself as well as unoccupied identifiers 255 through 31 and node 701 (ID=64) is responsible for itself as well as identifier range 32 through 63. Although the midway point between nodes 701 and 702 is at unoccupied identifier 31, node 762 is assigned responsibility for unoccupied identifier 31 such that each unoccupied identifier is the responsibility of a single node.

During time between the departure of node 702 and formulation of cached two-way agreement 763, nodes 701 and 762 do not process messages indicated for delivery to identifiers in the range between 255 and 63. Instead, nodes 701 and 762 queue any messages, expect those for formulating cached two-way agreement 763. After formulation of the cached two-way agreement 763 is complete, nodes 701 and 762 can then process the messages in accordance with cached two-way agreement 763.

When a new node joins a ring between two existing nodes, each existing node can formulate a routing agreement with the new node (and thus potentially giving up responsibility for a portion of unoccupied identifiers). This formulation can essentially split a range of unoccupied identifiers an existing node is responsible for between the joining node and the existing node. That is, each existing node potentially gives up responsibility for a portion of the existing node's unoccupied identifiers to the joining node.

Figure 7C:
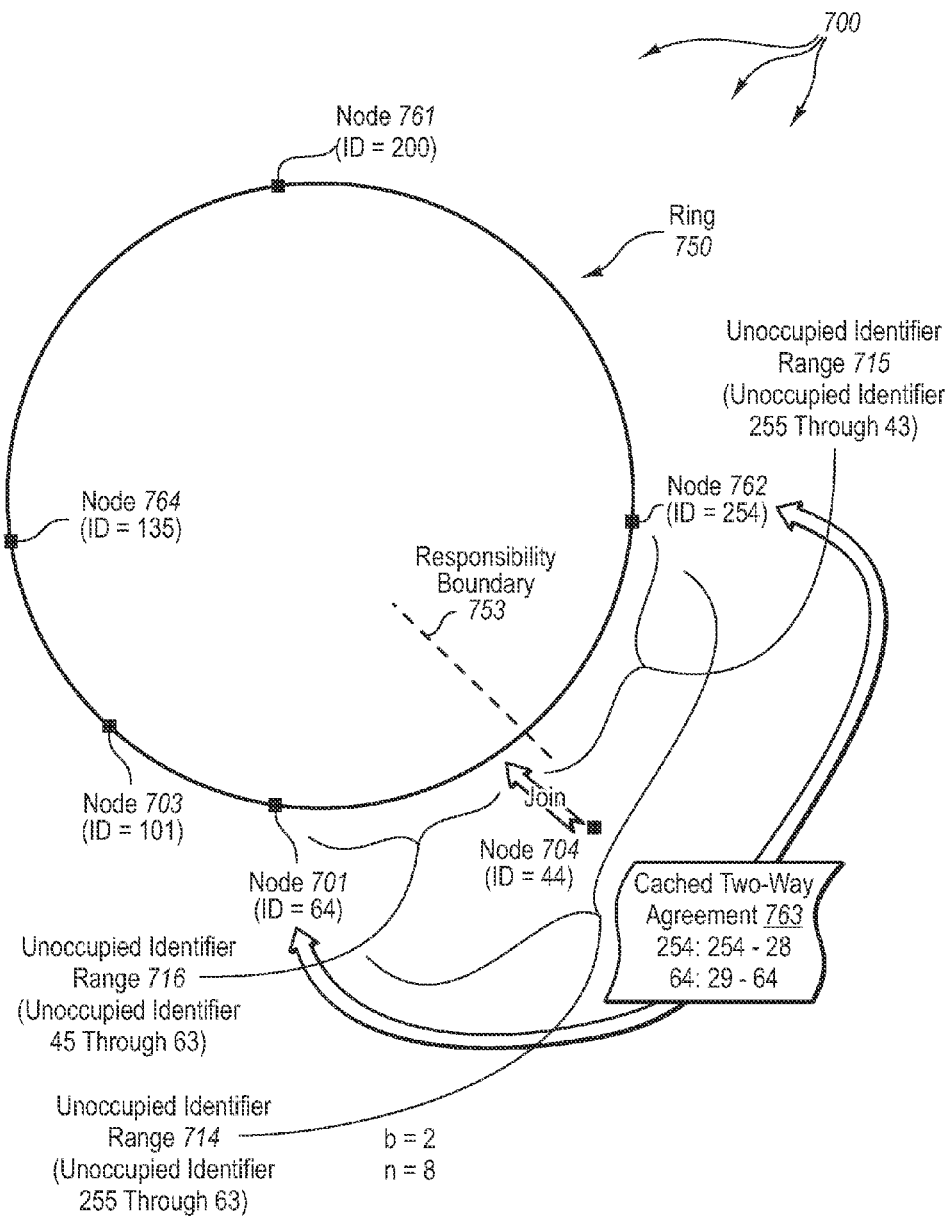

Referring now to FIG. 7C, at some time subsequent to the formulation of cached two-way agreement 763, node 704 (ID=44) can join ring 750. Subsequent to node 704 joining ring 750, node 762 can detect node 704 as its immediate successor. Likewise, node 701 can detect node 704 as its immediate predecessor. In response to each of the detections, unoccupied identifier range 714 is essentially split into unoccupied identifier range 715 (unoccupied identifiers 255 through 43) and unoccupied identifier range 716 (unoccupied identifiers 45 through 63). New cached-two way agreements can then be formulated to divide responsibility for unoccupied identifier ranges 715 and 716.

Figure 7D:
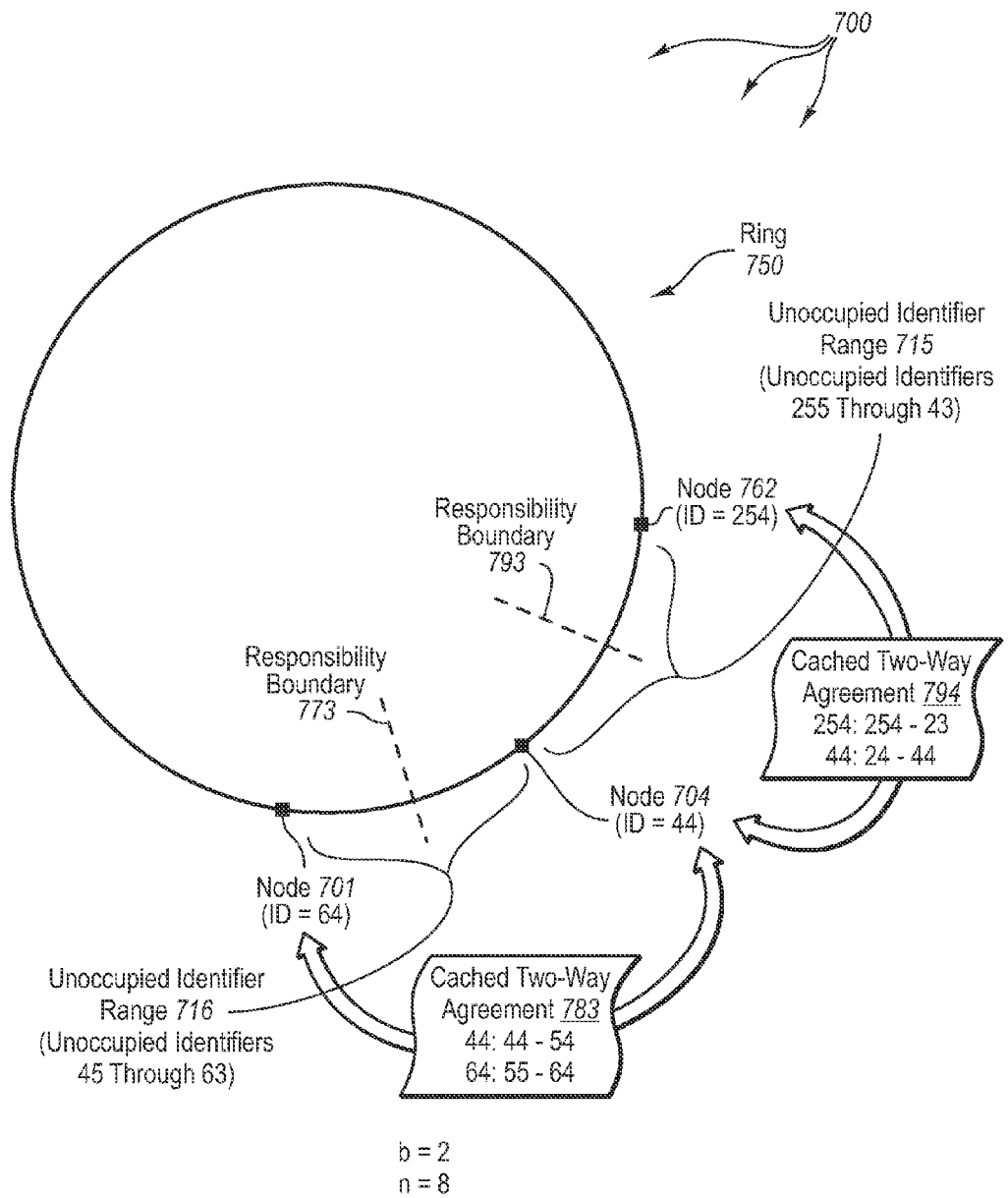

Referring now to FIG. 7D, upon identifying node 704 as a new immediate successor node, nodes 762 and 704 formulate cached two-way agreement 794 to that divides responsibility for unoccupied identifier range 715 (unoccupied identifiers 255 through 43). Unoccupied identified range 715 includes portions of unoccupied identifier range 714, which were previously the responsibility of node 762 and in this case some of which were previously the responsibility of node 701. Thus, portions of unoccupied identifier range 714 that were the responsibility of either node 762 or node 701, can become the responsibility of node 704 when node 704 joins ring 750.

Accordingly, as depicted by responsibility boundary 793 (between unoccupied identifier 9 and unoccupied identifier 24), node 962 (ID=254) and node 704 (ID=44) formulate cached two-way agreement 794. In accordance with cached two-way agreement 794, node 762 (ID=254) is responsible for itself as well as unoccupied identifiers 255 through 9 and node 704 (ID=44) is responsible for itself as well as identifier range 24 through 43. Although the midway point between nodes 701 and 702 is at unoccupied identifier 9, node 762 is assigned responsibility for unoccupied identifier 9 such that each unoccupied identifier is the responsibility of a single node.

Similarly, upon identifying node 704 as a new immediate predecessor node, nodes 701 and 704 formulate cached two-way agreement 783 that divides responsibility for unoccupied identifier range 716 (unoccupied identifiers 45 through 64). Unoccupied identified range 716 includes portions of unoccupied identifier range 714, which were previously the responsibility of node 701. Thus, portions of unoccupied identifier range 714, which were the responsibility of node 901, can become the responsibility of node 704 when node 704 joins ring 750.

Accordingly, as depicted by responsibility boundary 773 (between unoccupied identifier 54 and unoccupied identifier 55), node 704 (ID=44) and node 701 (ID=64) formulate cached two-way agreement 783. In accordance with cached two-way agreement 783, node 704 (ID=44) is responsible for itself as well as unoccupied identifiers 45 through 54 and node 701 (ID=64) is responsible for itself as well as identifier range 55 through 63. Although the midway point between nodes 701 and 702 is at unoccupied identifier 54, node 704 is assigned responsibility for unoccupied identifier 54 such that each unoccupied identifier is the responsibility of a single node.

During time between the joining of node 704 and formulation of cached two-way agreement 794, nodes 762 and 704 do not process messages indicated for delivery to identifiers in the range between 255 and 43. Instead, nodes 762 and 704 queue any messages, expect those for formulating cached two-way agreement 794. After formulation of the cached two-way agreement 794 is complete, nodes 762 and 704 can then process the messages in accordance with cached two-way agreement 794.

Similarly, during time between the joining of node 704 and formulation of cached two-way agreement 783, nodes 704 and 701 do not process messages indicated for delivery to identifiers in the range between 45 and 63. Instead, nodes 704 and 701 queue any messages, expect those for formulating cached two-way agreement 783. After formulation of the cached two-way agreement 783 is complete, nodes 704 and 701 can then process the messages in accordance with cached two-way agreement 783.

From the perspective of node 704, the combination of cached two-way agreement 794 and cached two-way agreement 783 can essentially represent a corresponding three-way agreement (not shown) between node 704, node 762, and node 701. From the perspective of node 704, the corresponding represented three-way agreement defines responsibility for (assigned and unoccupied) identifiers from and including ID=254 to and including ID=64.

In some embodiments modes perform a method for joining a two-way agreement. A current node accesses an indication that the configuration of the ring of nodes has changed, the indication indicative of a need to formulate a two-way agreement dividing responsibility for at least unoccupied identifiers on the ring between the current node and the immediate neighbor node. For example, referring to FIGS. 7A and 7B, node 701 and/or node 762 can access an indication, for example, from node 702, through monitoring of node 702, or from an arbitrator, that node 702 departed ring 750. The indication of node 702 departing ring 750 indicates to node 701 and/or node 762 a need to formulate a two-way agreement dividing responsibility for unoccupied identifier range 714 (unoccupied identifiers 255 through 63).

Alternately, referring to FIGS. 7C and 7D, node 701 can access an indication (e.g., sent as part of the join process of node 704) that node 704 has joined ring 750. The indication of node 704 joining ring 750 indicates to node 701 a need to formulate a two-way agreement dividing responsibility for unoccupied identifier range 716 (unoccupied identifiers 45 through 63). Similarly, node 762 can access an indication (e.g., sent as part of the join process of node 704) that node 704 has joined ring 750. The indication of node 704 joining ring 750 indicates to node 762 a need to formulate a two-way agreement dividing responsibility for unoccupied identifier range 715 (unoccupied identifiers 255 through 43).

The current node and the immediate neighbor node agree to a responsibility boundary between the current node and the immediate neighbor node that is to divide responsibility for the unoccupied identifiers between the current node and the immediate neighbor node. Unoccupied identifiers between the current node and the responsibility boundary are the responsibility of the current node and unoccupied identifiers between the responsibility boundary and the immediate neighbor node are the responsibility of the immediate neighbor node.

For example, referring to FIG. 7B node 701 and node 762 can agree to responsibility boundary 753, which is essentially between unoccupied identifiers 31 and 32. Thus, unoccupied identifiers between node 901 and responsibility boundary 753 (i.e., unoccupied identifiers 32 through 63) are the responsibility of node 701. Likewise, unoccupied identifiers between responsibility boundary 753 and node 762 (i.e., unoccupied identifiers 255 through 31) are the responsibility of node 762.

Referring to FIG. 7D, node 701 and node 704 can agree to responsibility boundary 773, which is essentially between unoccupied identifiers 54 and 55. Thus, unoccupied identifiers between node 701 and responsibility boundary 773 (i.e., identifiers 55 through 63) are the responsibility of node 701. Likewise, unoccupied identifiers between responsibility boundary 773 and node 704 (i.e., unoccupied identifiers 45 through 54) are the responsibility of node 904.

Still referring to FIG. 7D, node 704 and node 762 can agree to responsibility boundary 793, which is essentially between unoccupied identifiers 9 and 24. Thus, identifiers between node 704 and responsibility boundary 793 (i.e., unoccupied identifiers 24 through 43) are the responsibility of node 704. Likewise, unoccupied identifiers between responsibility boundary 793 and node 762 (i.e., unoccupied identifiers 255 through 9) are the responsibility of node 762.

Node Monitoring

In embodiments that use routing consistency, node monitoring can also be used to facilitate routing consistency. For example, to detect changes in the configuration of nodes in a ring or other overlay network, nodes an monitor one another.

Figure 8A:
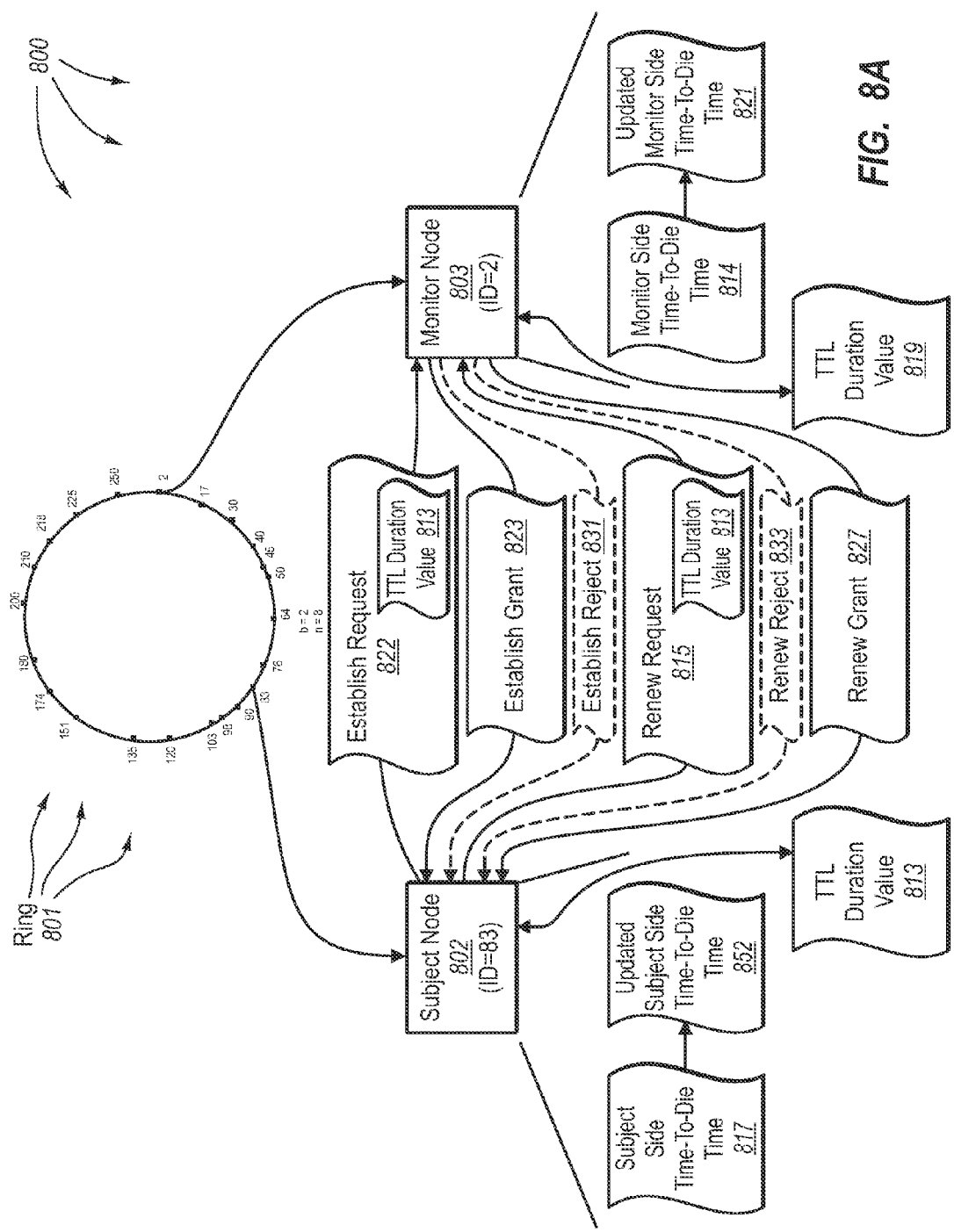
FIG. 8A illustrates an example ring architecture that facilitates one node monitoring another (e.g., a subject) node.

One-Way Monitoring: FIG. 8A illustrates an example ring architecture 800 that facilitates one node monitoring another node. As depicted, ring architecture includes at least ring 801 (and any number of other higher and/or lower level rings (not shown)). Ring 801 can be configured similar to ring 206 of FIG. 2. However, monitoring can occur on any ring of nodes or other overlay network.

FIG. 8A depicts an expanded view of subject node 802 (having ID=83) and monitor node 803 (having ID=2). In the depicted embodiment, monitor node 803 is to monitor subject node 802. However, any node on ring 801 can be configured to monitor any other node on ring 801.

To facilitate one-way monitoring, a subject node generates a subject side time-to-live duration value for use in monitoring of the subject node. For example, subject node 802 can establish time-to-live (TTL) duration value 813. TTL duration value 813 indicates a duration for which subject node 802 can assume a monitoring relationship with monitor node 803 is active. The subject can send an establish request to the monitor node, the establish request indicative of the subject node requesting that the monitor node monitor the subject node, the establish request including the subject side time-to-live duration value. For example, subject node 802 can send establish request 822, including TTL value duration 813, to monitor node 803.

The subject node establishes an existing subject side time-to-die time based on the subject side time-to-live duration value and the time the establish request was sent, wherein the subject node clock reaching the existing subject side time-to-die time, prior to receiving an establish grant from the monitor node, is an indication of the subject node having to transition to a failure state. For example, subject node 802 can establish subject side time-to-die time 817 based on TTL duration value 813 and the time the establish request 822 was sent to monitor node 803. Subject side time-to-die time 817 can be a time relative to subject node 802. If a clock of subject node 802 reaches subject side time-to-die time 817, prior to receiving an establish grant form monitor node 803, subject node 802 is to transition to a failure state. In some embodiments, when a clock of subject node 802 reaches subject side time-to-die time 817, prior to receiving an establish grant from monitor node 803, a failure state is caused. In other embodiments, other activities occur to transition subject node 802 into a failure state.

The monitor node receives the establish request from the subject node, the establish request indicative of the subject node requesting that the monitor node monitor the subject node, the establish request including at least the subject side time-to-live duration value, the subject side time-to-live duration value used to determine a subject side time-to-die time at the subject node, wherein the subject node clock reaching the subject side time-to-die time, prior to receiving an establish grant from the monitor node, is an indication of the subject node having to transition to a failure state. For example, monitor node 803 can receive establish request 822, including TTL duration value 813, from subject node 802. TTL duration value 813 having been used at subject node 802 to establish subject side time-to-die time 817.

The monitor node derives a monitor side time-to-live duration value from the subject side time-to-live duration value. For example, monitor node 803 can use TTL value duration 813 to derive TTL duration value 819. In some embodiments, monitor node 803 copies TTL duration value 813 to derive TTL duration value 819. In these embodiments, TTL value duration 813 and TTL value duration 819 are equal. In other embodiments, monitor node 803 modifies TTL duration value 813 to derive TTL duration value 77. In these other embodiments TTL duration value 713 and TTL duration value 819 differ. For example, monitor node 803 can increase the value of TTL duration value 813 to derive TTL duration value 819 such that TTL duration value 819 is larger than TTL duration value 813.

The monitor node establishes a monitor side time-to-die time based on the monitor side time-to-live duration value and the time the establish request was received, the monitor node clock reaching the monitor side time-to-die time, prior to receiving a renew request from the subject node, being indicative of a suspected failure of the subject node. For example, monitor node 803 monitor side time-to-die time 814 based on TTL duration value 819 and the time establish request 822 was received. Monitor side time-to-die time 814 can be a time relative to monitor node 803. If a clock of monitor node 803 reaches monitor side time-to-die time 814, prior to receiving a renew request from subject node 802, monitor node 803 suspects subject node 802 of failure.

The monitor node sending an establish grant to the subject node to indicate to the subject node that the monitor node has agreed to monitor the subject node. For example, monitor node 803 can send establish grant 823 to subject node 802. The subject node receives the establish grant from the monitor node, the establish grant indicative of the monitor node monitoring the subject node. For example, subject node 802 can receive establish grant 823 from monitor node 803. Generally, establish grant 823 indicates that monitor node 803 has agreed to monitor subject node 802. In some embodiments, the establish grant message can include the monitor side TTL duration value. For example, it may be establish grant 823 includes TTL duration value 819.

Alternately, a monitor node can send an establish reject to a subject node to indicate to the subject node that the monitor node has not agreed to monitor the subject node. For example, in response to receiving establish request 822, monitor node 803 can alternately (as indicated by the dashed line) send establish reject 831 to subject node 802. A subject node can receive an establish reject sent from a monitor node. For example, subject node 802 can receive establish reject 831 from monitor mode 803. Establish reject 831 generally indicates to subject node 802 that monitor node 803 has not agreed to monitor subject node 802.

From time to time (and intermingled between the performance of other operations within ring architecture 800), a subject node can renew an established monitoring agreement with a monitor node. Generally, the subject node leaves the existing agreement in force (the current subject-side-time to die time) until a new grant is received. However, the subject node can generate a new TTL duration value and derive what an updated time-to-die time would be. The subject node then sends the new TTL duration value to the monitor node. The monitor node receives the new TTL duration value. When appropriate the monitor node grants the renew request and sends a renew grant back to the subject. The subject node receives the renew grant. In response to receiving the renew grant the subject implements the renewed agreement using the updated time-to-die time as the new current time-to-die time.

Renewal of Monitoring Agreement: In some embodiments, a node renews an established monitoring agreement with another node. Renewing an established monitoring agreement can include the subject node sending a renew request to the monitor node prior to the subject node clock reaching the subject side time-to-die time. For example, subject node 802 can send renew request 815, including TTL duration value 813, to monitor node 803 prior to a clock of subject node 802 reaching subject side time-to-die time 817. In some embodiments, renew request 815 does not include a subject side TTL duration value. In these embodiments, continued use of TTL duration value 813 can be inferred. In other embodiments, TTL duration value 813 is expressly included in renew request 815. In yet other embodiments, a different subject side TTL duration value is included in renew request 815. A new subject side TTL duration value can be generated and used by subject node 802 in response to configuration changes of subject node 702 and/or to configuration changes elsewhere in ring 801 (e.g., changed network conditions).

Node 802 can also calculate what an updated subject side time-to-die time is to be if a corresponding renew grant responsive to renew request 815 is received. The calculation can be based at least on the time renew request 815 was sent and on the subject side TTL duration value related to or associated with renew request 815.

The monitor node receives a renew request from the subject node subsequent to sending the establish grant message and prior to the monitor node clock reaching the monitor side time-to-die time, the renew request indicating that the subject node has not failed. For example, monitor node 803 can receive renew request 815 subsequent to sending establish grant 823 and prior to a clock of monitor node 803 reaching monitor side time-to-die time 814. Reception of renew request 815 can indicate to monitor node 803 that subject node 802 has not failed.

The monitor node grants the renew request to the subject node. For example, monitor node 803 can grant renew request 815.

The monitor node establishes an updated monitor side time-to-die time in response to and based at least on the time the renew request was received, the monitor node clock reaching the updated monitor side time-to-die time, prior to receiving another renew request from the subject node, being indicative of a suspected failure of the subject node. For example, monitor node 803 can establish updated monitor side time-to-die time 821 in response to and based on the time renew request 815 was received and the implied or indicated monitor TTL duration value related to or potentially contained in a renew request 815. Updated monitor side time-to-die time 821 can be a time relative to monitor node 803. Updated monitor side time-to-die time 821 can be subsequent to monitor side time-to-die time 814. However, there is no requirement that monitor side time-to-die time 814 have occurred before establishing updated monitor side time-to-die time 821. Thus, it is also possible that updated monitor side time-to-die time 821 is in fact prior to (or the same as) monitor side time-to-die time 814. If a clock of monitor node 803 reaches updated monitor side time-to-die time 821, prior to receiving another renew request from subject node 802, monitor node 803 suspects subject node 802 of failure.

If no subject side TTL duration value is included in renew request 815 (and thus TTL duration value 813 is inferred) or if renew request expressly includes TTL duration value 813, monitor node 803 can also use TTL duration value 819 to establish updated monitor side time-to-die time 821. On the other hand, if a subject side TTL duration value other than TTL duration value 813 is expressly included in renew request 815, monitor node 803 can use the other expressly included subject side TTL duration value to derive a new monitor side TTL duration value. From the new monitor side TTL duration value, monitor node 803 can then establish updated monitor side time-to-die time 821.

The monitor node sends a renew grant to the subject node to indicate to the subject node that the monitor node has agreed to continue monitoring the subject node. For example, monitor node 803 can send renew grant 827 to subject node 802. The subject node receives the renew grant from the monitor node subsequent to sending the corresponding renew request and prior to the subject node clock reaching the subject side time-to-die time, the renew grant message indicative of the monitor node continuing to monitor the subject node. For example, subject node 802 can receive renew grant 827 from monitor node 803 subsequent to sending renew request 815 and prior to a clock at subject node 802 reaching subject side time-to-die time 817. Generally, renew grant 827 is indicative of monitor node 803 agreeing to continue to monitor subject node 802.

Alternately, a monitor node can send a renew reject to a subject node to indicate to the subject node that the monitor node is no longer agreeing to monitor the subject node. For example, in response to receiving renew request 815, monitor node 803 can alternately (as indicated by the dashed line) send renew reject 833 to subject node 802. A subject node can receive a renew reject sent from a monitor node. For example, subject node 802 can receive renew reject 833 from monitor mode 803. Renew reject 831 generally indicates to subject node 802 that monitor node 803 is no longer agreeing to monitor subject node 802.

The subject node transitions to a previously calculated updated subject side time-to-die time in response to receiving the renew grant, wherein the subject node clock reaching the updated subject side time-to-die time, prior to receiving another renew grant from the monitor node, is an indication of the subject node having to transition to a failure state. For example, subject node 802 can transition to updated subject side time-to-die time 852 when the corresponding renew grant message is received. Updated subject side time-to-die time 852 can have been calculated at around the time renew request 815 was sent to monitor node 803. Updated subject side time-to-die time 852 can have been calculated based on the time corresponding renew request 815 was sent and on the TTL duration related to or associated with renew request 815. Updated subject side time-to-die time 852 can be a time (e.g., subsequent, prior, or equal to subject side time-to-die time 817) relative to subject node 802.

If TTL value 813 is still the appropriate TTL value, subject node 702 can also use TTL duration value 813 to establish updated subject side time-to-die time 852. If another TTL duration value has been generated, subject node 802 can also use the other generated TTL duration value to establish updated subject side time-to-die time 852.

Subsequent, to establishment of a current subject side time-to-die time (either 817 or 852), it may be a clock at subject node 802 reaches the current subject side time-to-die time prior to receiving another renew grant from monitor node 803. This may result from communication errors between subject node 802 and monitor node 803. For example, subject node 802 may send another renew request subsequent receiving renew grant 827 and prior to a clock of subject node 802 reaching updated subject side time-to-die time 852. However, due to communication failures the other renew request does not reach monitor node 803. Alternately, the other renew request may be received at monitor node 803, but the corresponding renew grant from monitor node 803 does not reach subject node 802 due to communication errors. In either event, a clock at subject node 802 may reach a current subject side time-to-die time prior to receiving the corresponding renew grant responsive to the other renew request.

Alternately, subject node 802 can malfunctioning such that subject node 802 is prevented from sending another renew request to monitor node 803 prior to a clock at subject node 802 reaching t updated subject side time-to-die time 852.

However, whether or not a renew request is sent, if a renew grant is not received prior to a clock at subject node 802 reaching a current subject side time-to-die time 852, subject node 802 transitions into a failure state.

Referring back to monitor node 803, it may be that a clock at monitor node 803 reaches a monitor side time-to-die time (either 814 or 821) prior to receiving another renew request from subject node 802 (either due to a malfunction at subject node 802 or to communication errors in ring 801). As a result, monitor node 803 suspects subject node 802 of failure. Monitoring node 803 can transition to a timeout state indicative of detecting a suspected failure at another node.

Figure 8B:
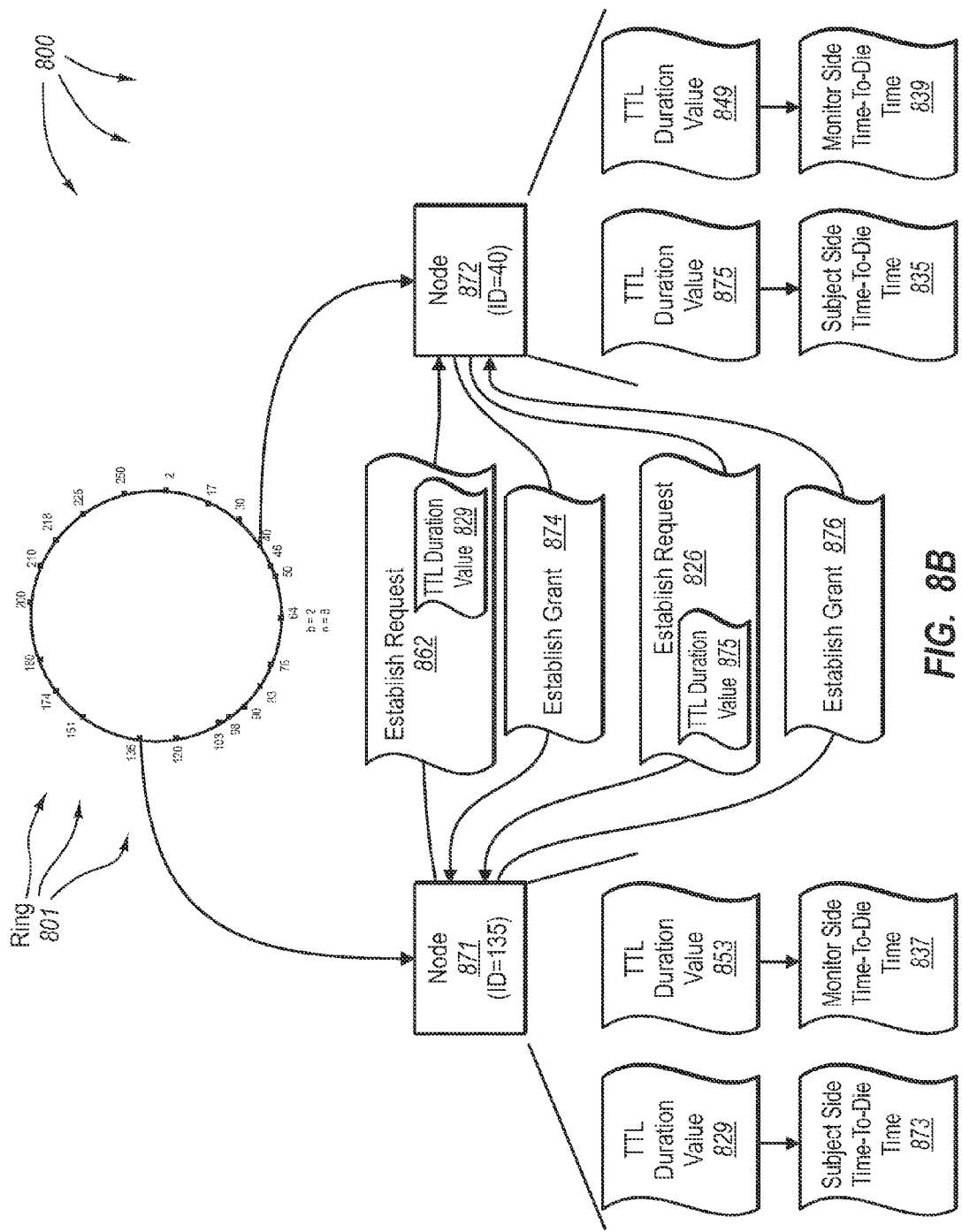
FIG. 8B illustrates an example ring architecture that facilitates two nodes monitoring each other.

Two way monitoring: In other embodiments a pair of nodes can monitor each other. Thus, a first node can monitor a second node and the second node can also monitor the first node. For example, each node can implement both the subject node side and the monitor node side of one-way monitoring through communication with the other node. FIG. 8B illustrates an example ring architecture 800 that facilitates two nodes monitoring each other.

Node 871 can generate TTL duration value 829 for use in monitoring node 871. Node 871 can send establish request 862, including TTL duration value 829, to node 872. Node 871 can also establish subject side time-to-die time 873 based on TTL duration value 829. Node 872 can receive establish request 862, including TTL duration value 829, from node 871. Node 872 can derive TLL duration value 849 from TTL duration value 829. Node 872 can establish monitor side time-to-die time 839 based on TTL duration value 849. Node 872 can send establish grant 874 to node 871. Node 871 can receive establish grant 874 from node 872.

In parallel, node 872 can generate TTL duration value 875 for use in monitoring node 872. Node 872 can send establish request 826, including TTL duration value 875, to node 871. Node 872 can also establish subject side time-to-die time 835 based on TTL duration value 875. Node 871 can receive establish request 826, including TTL duration value 875, from node 872. Node 871 can derive TLL duration value 853 from TTL duration value 833. Node 871 can establish monitor side time-to-die time 837 based on TTL duration value 853. Node 871 can send grant message 876 to node 872. Node 872 can receive grant message 876 from node 871.

Alternately, either of nodes 871 and 872 reject an establish request from the other node. For example, node 871 can reject establish request 862. Likewise, node 872 can reject establish request 826. When either node rejects an establish request, it can send an establish reject (e.g., similar to establish reject 831) to the other node. This indicates to the other node that no monitoring agreement has been established.

Node 871 and node 872 can then exchange renew requests and renew grants (as well as renew rejects similar to renew reject 833) as previously described. Accordingly, each of node 871 and node 872 are both a subject node and a monitor node. Based on the depicted TTL duration values and time-to-die times in FIG. 8B, various events may occur during and/or after the monitor relationships are established.

If a clock at node 871 reaches subject side time-to-die time 873 prior to receiving a renew grant from node 872, node 871 transitions to a failure state. If a clock at node 872 reaches monitor side time-to-die time 839 prior to receiving a renew request from node 871, node 872 suspects node 871 of failure.

If a clock at node 872 reaches subject side time-to-die time 835 prior to receiving a renew grant from node 871, node 872 transitions to a failure state. If a clock at node 871 reaches monitor side time-to-die time 837 prior to receiving a renew request from node 872, node 871 suspects node 872 of failure.

Arbitration of Node Failures

In embodiments that use routing consistency, arbitration of node failures can also be used to facilitate routing consistency. For example, due to various different types of communication errors and node malfunctions, there exists some possibility that each node in a pair of nodes will suspect failure of the other node. Further, each node may suspect that it is functioning properly.

In some ring architectures, portions of resources are configured such that a single node controls a resource at a given moment in time. Further, the needed availability of some resources may also be high such that essentially constant control by a node is required. Thus, when a node fails, control of various resources may need to be transferred to another node. Accordingly, when a node in a pair of nodes suspects the other node of failure, arbitration mechanisms can be used to determine at least which node has or should fail.

For example, when each node in a pair nodes suspects the other node of failing, each node can transition to a timeout state and report their suspicion to an arbitration facility. When in a timeout state, certain other processing at each node can be suspended until the results of the arbitration are received. The arbitration facility can report back to a node indicating if it is to remain active. For example, an arbitration facility can send an accept message to a reporting node that is to remain active. The arbitration facility can send a deny message to a reporting node that is to transition to a failure state. A node that receives an accept message can remain active. A node that doesn't not receive an accept message (e.g., due to network conditions) or that receives a deny message transitions to a failure state.

Figure 8C:
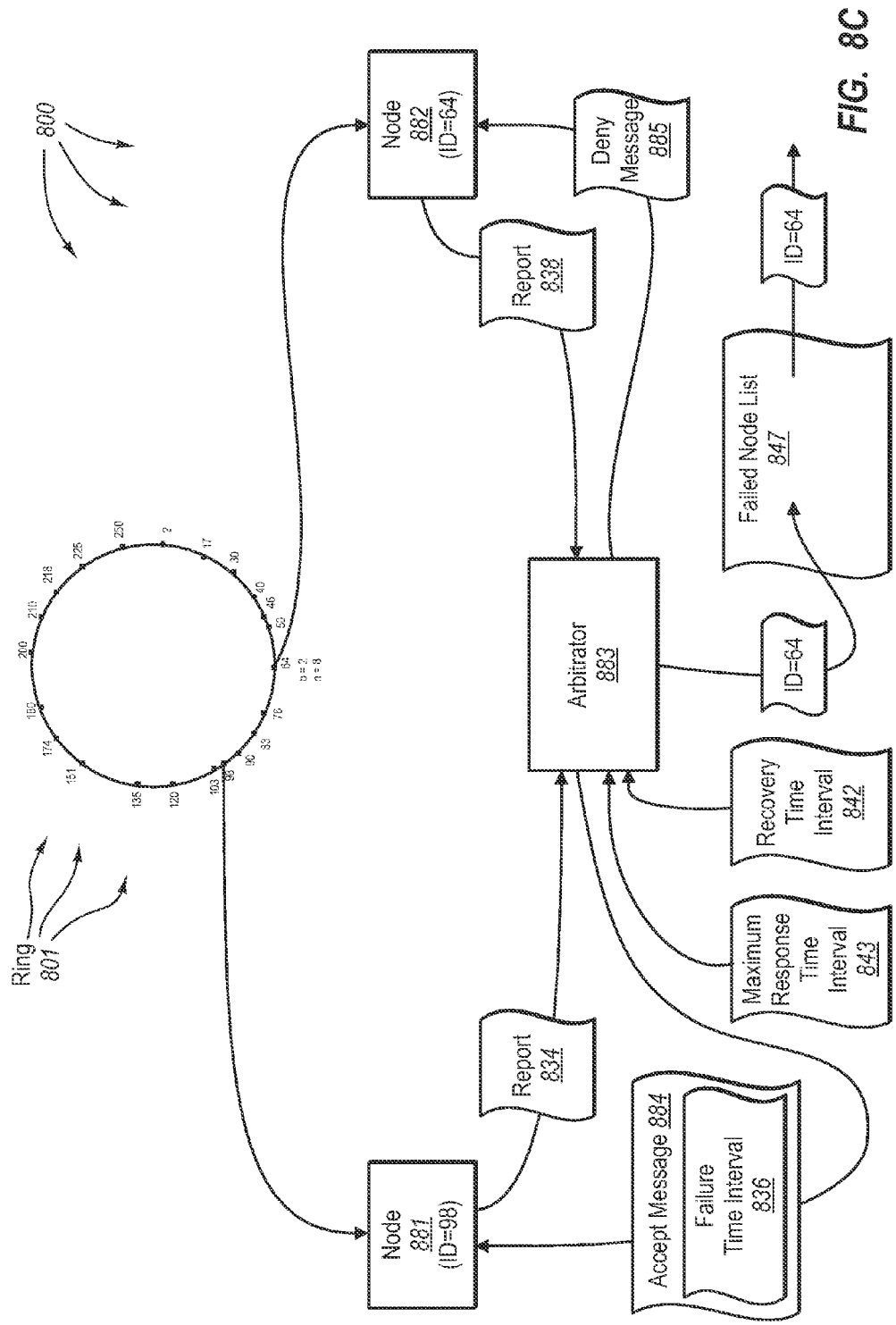
FIG. 8C illustrates an example ring architecture that facilitates arbitration when mutually monitoring nodes can each report that the other node is suspected of failing.

FIG. 8C illustrates example ring architecture 800 that facilitates arbitration when mutually monitoring nodes each can report that the other node is suspected of failing. FIG. 8C depicts an expanded view of node 881 (having ID=98), monitor node 882 (having ID=64), and arbitrator 883.

In some embodiments, arbitrator 883 is also a member of ring 801. In other embodiments, arbitrator 883 is a member of an ancestor ring of ring 801 but is not member of ring 801. In further embodiments, arbitrator 883 is external to the ring hierarchy that includes ring 801. For example, arbitrator 883 can be included in a separate arbitration federation ring of nodes. Nodes in the arbitration federation can be configured as arbitrators for the nodes of ring 801 and its ancestors.

In some embodiments, arbitrator 883 is mutually agreed to by node 871 and node 882 to arbitrate for nodes 881 and 882. In other embodiments, arbitrator 883 is assigned to arbitrate for nodes 881 and 882 by another entity. The other entity can be a node internal to the ring hierarchy including ring 801 (e.g., a seed node) or, for example, a human administrator. For example, the other node can be a member of ring 801 or a member of an ancestor ring of ring 801 but not member of ring 801. Alternately, the other entity can be external the ring hierarchy including ring 801. For example, the other entity can be a node that is a member of separate arbitration federation ring.

Arbitrator 883 can have varying knowledge of the ring hierarchy including ring 801. For example, arbitrator 883 can have global knowledge of the ring hierarchy including ring 801. Alternately, arbitrator 883 can have knowledge of some subset of rings included the ring hierarchy including ring 801. In other embodiments, arbitrator 883 has knowledge of a subset of nodes in ring 801 including (and potentially only) nodes 881 and 882.

Arbitrator 883 can be configured to arbitrate for any number of node pairs including, but not limited to, nodes 881 and 882. In some embodiments, an arbitration mechanism has no knowledge of nodes it is to arbitrate for prior to receiving a report of a suspected node failure. Thus, although a pair of nodes have agreed to use arbitrator 883 or arbitrator 883 has been assigned to arbitrate for a pair of nodes, arbitrator 883 may be unaware of any agreement or assignment prior to receiving a report of a suspected node failure for a node in the pair of nodes.

Arbitration can include arbitrating between nodes that present conflicting failure reports. For example, when a first node is monitoring a second node and the second node is also monitoring the first node, it may be that each node reports that the other node is suspected of failure. The suspected failure can be detected using virtually any failure detection mechanisms including those previously described in this document.

Failed node list 847 can include a list of nodes that have been reported as suspected failed nodes. Nodes can be report other nodes as suspected failed nodes to arbitrator 883 and, when appropriate, arbitrator 883 can include the reported nodes in failed node list 847. Arbitrator 883 can remove failed nodes from failed node list 847 after appropriate periods of time (e.g., at a future time when the likelihood of continued conflict is not possible). For example, entries in failed node list 847 can be removed at recovery time interval 842 after they were inserted into failed node list 847. Recovery time interval 842 can be long enough to insure that nodes that have been told to fail do fail.

In some embodiments, an arbitrator arbitrates between conflicting reports of suspected node failures. To facilitate arbitration, a first node sending a report to an arbitration facility that a second node is suspected of failing. For example, node 881 can send report 834 to arbitrator 883. The arbitrator receives a report from the first node that the second node is suspected of failing. For example, arbitrator 883 can receive report 834 from node 881.

The arbitrator can determine that no other node has suspected the first node of failing within a specified recovery time interval prior to receiving the report from the first node. For example, arbitrator 883 can determine that no other node has suspected node 881 of failing within recovery time interval 842 (after which arbitrator 883 would have removed node 881 from failed node list 847 anyway). The arbitrator recording in a list that the second node is in a failure state. For example, arbitrator 883 can record in failed node list 847 that node 782 (ID=64) is in a failure state.

The arbitrator sending an accept message to the first node within a maximum response time interval, the accept message including a failure time value indicative of a time period after which the second node is guaranteed to transition into a failure state. For example, arbitrator 883 can send accept message 884 to node 881 within maximum response time interval 843 of receiving report 834. Accept message 884 includes failure time interval 836 indicative of a time when node 882 is guaranteed to have transitioned into a failure state. Generally, a maximum response time interval represents a point in time after which a requester (e.g., node 881 or 882) assumes the an arbitration facility (arbitrator 883) will not answer a request for arbitration (e.g., report 834 or 838). When a maximum response time interval expires at a requester subsequent to sending a request for arbitration, the requester performs similar (and potentially identical) operations to those that would be performed if an express deny message was received.

The first node receiving an accept message from the arbitration facility within a maximum response time interval, the accept message including a time value indicative of a time period after which the second node is guaranteed to transition into a failure state. For example, node 881 can receive accept message 884, including failure time interval 836, from arbitrator 883. Failure time interval 836 is indicative of a time when node 882 is guaranteed to have transitioned into a failure state. Thus, after the expiration of failure time interval 836, node 881 can attempt to claim control of one or more ring resources previously controlled by node 882.

The first node claims control of one or more ring resources previously controlled by the second node subsequent to expiration of the time period. For example, node 881 can claim control of one or more ring resources within ring 801 previously controlled by the node 882 subsequent to expiration of failure time interval 836.

Claimed ring resources can vary depending on the ring resources controlled by node 882 prior to transition to a failure state. For example, node 881 can assume message routing responsibilities of node 882 (e.g., the responsibility to receive messages directed to a range of identifies on ring 801), any seed node responsibilities of node 882, any arbitration responsibilities of node 882, etc.

At some time at or after the first node reports the second node, the second node may also suspect the first node of failure. For example, it may be that node 782 also suspects node 881 of failure.

The second node sends a report to the arbitration facility that the first node is suspected of failing. For example, node 882 can send report 838 to arbitrator 883 that node 881 is suspected of failure. The arbitrator receives a report from the second node that the first node is suspected of failing, the report from the second node received within the specified recovery time interval subsequent to receiving the report from the first node. For example, arbitrator 883 can receive report 838 from node 882 that node 881 is suspected of failure within recovery time interval 842 of receiving report 834.

The arbitrator referring to the list to determine that the second node is to transition to a failure state. For example, arbitrator 883 can refer to failed node list 847 to determine that node 882 (ID=64) is to transition to a failure state.

The arbitrator sends a deny message to the second node to cause the second node to transition into a failure state. For example, arbitrator 883 can send deny message 885 to node 882 to cause node 882 to transition to a failure state. The second node receives a deny message from the arbitration facility. For example, node 882 can receive deny message 885 from arbitrator 883.

The second node transitions into a failure state. For example, node 882 can transition into a failure state in response to receiving deny message 885. After failing, node 882 can subsequently attempt to rejoin ring 801.

Thus, embodiments of the invention can be used to replicate timers within an overlay network and can be used to continue a process at a different node within the overlay network based on a replicated timer. Accordingly, embodiments of the invention can be used to increase the availability of timer data as well as compensate for node failures within an overlay network.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a node in an overlay network, the node including a processor and system memory, the overlay network including a plurality nodes, each node in the plurality of nodes being assigned responsibility for a range of identifiers on the overlay network, a method for replicating timers within the overlay network, the method comprising:

receiving data for a process at the node, the node being assigned responsibility responsible for a specified range of identifiers on the overlay network, the process identified by an identifier within the specified range of identifiers;

the process processing the data to partially completed a portion of work;

the process outputting a timer based on the partially completed portion of work, the timer indicative of an amount of time that further progress towards completing the portion of work is to be suspended, the timer including deferred data that is to be processed when further progress towards completing the portion of work is resumed and the timer including a designated time indicating when the timer is to expires and further progress towards completing the portion of work is to be resumed;

supplementing the timer with the identifier; and replicating the timer to a plurality of other nodes on the overlay network for storage in durable storage at the plurality of other nodes, replicating the timer increasing the availability of the deferred data such that if responsibility for the identifier is subsequently reassigned to one of the plurality of other nodes, the deferred data is available to the process when the timer expires and further progress towards completing the portion of work is to resume.

2. The method as recited in claim 1, wherein receiving data for a process at the node comprises receiving data for a workflow having an identifier within the specified range of identifiers.

3. The method as recited in claim 1, wherein receiving data for a process at the node comprises receiving data from a front end node, the front end node providing an interface between the overlay network and systems external to the overlay network.

4. The method as recited in claim 1, wherein the process processing the data to perform some work comprises performing a portion of workflow.

5. The method as recited in claim 1, wherein the process processing the data to perform some work comprises queuing the data within a workflow process.

6. The method as recited in claim 5, further comprising:
tracking the timer in system memory;
determining that the designated time has been reached;
accessing the timer from the durable storage;
determining from the timer that the identifier is still in within the specified range of identifiers; and
sending the data to the process in response to determining that the designated time has been reached and in response to determining that the identifier is still in within the specified range of identifiers.

7. The method as recited in claim 1, further comprising: storing the timer, including the data, the designated time, and the identifier, in durable storage.

8. The method as recited in claim 1, wherein the overlay network is a ring overlay network and wherein the node is a node on the ring overlay network.

9. At a node in an overlay network, the node including a processor and system memory, the overlay network including a plurality nodes, each node in the plurality of nodes assigned responsible for a range of identifiers on the overlay network, the node assigned responsibility for a specified range of identifiers on the overlay network, a method for assuming ownership of a replicated timer, the method comprising:

receiving a replicated timer related to a process at another node on the overlay network, the replicated timer representing that the process has partially completed a portion of work at the other node, the timer indicating that further progress towards completing the portion of work is suspended for some period of time, the timer including timer data that is to be processed when further progress toward completing the portion of work resumes, a designated time when the timer is to expire, and an identifier for the process, the identifier being outside the specified range of identifiers assigned to the node;

detecting a change in the node configuration on the overlay network subsequent to receiving the replicated timer;

updating the specified range of identifiers for the node based on the detected change in node configuration, the update to the specified range of identifiers changing the assigned responsibilities for the node;

determining that the identifier for the process is within the updated specified range of identifiers such that the node has been assigned responsibility for when the timer expires, in view of the changed node configuration;

determining that the designated time has been reached subsequent to the node being assigned responsibility for indicating when the timer expires;

indicating to the process that that timer has expired; and submitting the timer data to the process in response to the indication such that process can use the timer data to progress further towards completing the portion of work.

10. The method as recited in claim 9, wherein receiving a replicated timer for a process at another node comprises receiving a replicated timer for a workflow process at another node.

11. The method as recited in claim 9, wherein detecting a change in the node configuration on the overlay network comprises detecting that a node has departed the overlay network.

12. The method as recited in claim 9, wherein detecting a change in the node configuration on the overlay network comprises detecting that a node has joined the overlay network.

13. The method as recited in claim 9, wherein updating the specified range of identifiers for the node comprises the node increasing the specified range of identifiers to include more identifiers.

14. The method as recited in claim 9, further comprising tracking the timer in system memory.

15. The method as recited in claim 9, further comprising locally activating the process at the node.

16. The method as recited in claim 15, wherein submitting the timer data to the process comprises queuing the data within a workflow process for processing by the workflow instance.

17. The method as recited in claim 9, wherein the overlay network is a ring overlay network and wherein the node is a node on the ring overlay network.

18. An overlay ring network, the overlay ring network including a plurality of peer nodes, each peer node assigned responsibility for a range of identifiers within the distributed hash table, each node including:
one or more processors; and
system memory having stored thereon computer executable instructions that, when executed at one of the one or more processors, cause the node to participate in workflow processing within the overlay network, including each node being configured to a) initiate a process for a workflow, b) progress through a workflow as the node assigned responsibility for the workflow, and c) transition to the node assigned responsibility for a workflow, wherein a) initiating a process for a workflow includes:
locally activating a workflow process for a workflow at the node; and
co-locating a queue and a workflow runtime for the workflow within a locally activated process;

b) progressing through a workflow as the node assigned responsibility for the workflow includes:
receiving data for the workflow at the node, the workflow identified by an identifier within the specified range of identifiers;
processing the received data at the workflow runtime to perform some work;
outputting a timer based on the performed work, the timer indicative of an amount of time the workflow is to sleep before again awakening to process data, the timer including deferred data that is to be processed when the workflow awakens and the timer including a designated time when the workflow is to be awaken;
replicating the timer to a plurality of other nodes on the ring overlay network, replicating the timer increasing the availability of the timer such that if responsibility for the workflow is subsequently reassigned to one of the plurality of other nodes, the timer is available to a workflow runtime at the reassigned node; and c) transitioning to the node assigned responsibility for a workflow includes:
receiving a replicated timer for a workflow another node on the overlay network, the timer representing that a workflow the timer indicating the process is to sleep for some period of time before awakening to process data, the replicated timer including timer data that is to be processed when the process awakens, a designated time when the process is to be awaken, and an identifier for the process, the identifier being outside the specified range of identifiers assigned to the node;
detecting a change in the node configuration on the overlay network subsequent to receiving the replicated timer;
updating the specified range of identifiers for the node based on the detected change in node configuration, the update to the specified range of identifiers changing the assigned responsibilities for the node;
determining that the identifier for the process is within the updated specified range of identifiers such that the node has been assigned responsibility for the process in view of the changed node configuration;
determining that the designated time has been reached subsequent to the node being assigned responsibility for the process;
locally activating a workflow instance for the workflow at the node in response to determining that the designated time has been reached;
submitting the timer data to a queue for the workflow instance; and
the workflow instance at the node processing the timer data to continue the portion of work from the point of partial completion reached at the other node.

19. The system as recited in claim 18, wherein the overlay network is based on a distributed hash table.

20. The system as recited in claim 18, wherein nodes store timers in durable storage.

* * * * *